United States Patent
Suzuki et al.

(10) Patent No.: US 11,193,467 B2
(45) Date of Patent: Dec. 7, 2021

(54) POWER CONTROL APPARATUS

(71) Applicant: DENSO CORPORATION, Kariya (JP)

(72) Inventors: Takuto Suzuki, Kariya (JP); Hiroshi Inamura, Kariya (JP)

(73) Assignee: DENSO CORPORATION, Kariya (JP)

(*) Notice: Subject to any disclaimer, the term of this patent is extended or adjusted under 35 U.S.C. 154(b) by 372 days.

(21) Appl. No.: 16/336,852

(22) PCT Filed: Sep. 27, 2017

(86) PCT No.: PCT/JP2017/035071
§ 371 (c)(1),
(2) Date: Mar. 26, 2019

(87) PCT Pub. No.: WO2018/062324
PCT Pub. Date: Apr. 5, 2018

(65) Prior Publication Data
US 2021/0184456 A1  Jun. 17, 2021

(30) Foreign Application Priority Data
Sep. 30, 2016 (JP) .............. JP2016-194600

(51) Int. Cl.
*F02N 11/08* (2006.01)
*B60L 3/00* (2019.01)
(Continued)

(52) U.S. Cl.
CPC .............. *F02N 11/087* (2013.01); *B60L 3/00* (2013.01); *B60L 58/13* (2019.02); *B60R 16/033* (2013.01);
(Continued)

(58) Field of Classification Search
None
See application file for complete search history.

(56) References Cited

U.S. PATENT DOCUMENTS 4,789,817 A * 12/1988 Asakura ................ H02J 7/1446
322/28
8,159,176 B2 * 4/2012 Arai ....................... B41J 19/202
318/685
(Continued)

FOREIGN PATENT DOCUMENTS

JP  2010130768 A * 6/2010 ............ B60L 3/0069
JP  2015-149849 A   8/2015

OTHER PUBLICATIONS

Oct. 31, 2017 International Search Report issued in International Patent Application PCT/JP2017/035071.

*Primary Examiner* — Kevin R Steckbauer
(74) *Attorney, Agent, or Firm* — Oliff PLC

(57) ABSTRACT

A power system with an electric rotating machine providing an operation of power generation and power running, a switching circuit providing electricity for each phase, by switching a plurality switching elements ON/OFF by the electric rotating machine, a battery section connected to the switching circuit, and switches on electrical pathway, between the switching circuit and the battery section. A power shutoff section to shutoff an electrical pathway when an overcurrent flows in, at least one of the electric rotating machine and the switching circuit. Power control devices are provided with an overcurrent determination which determines that an overcurrent has occurred, based on results of, a first determination that determines a current flow has increased to a predetermined over current threshold, and a second determination that determines that current flow has decreased thereafter, and a switch control that switches the switches open based on a determined result of the overcurrent determination.

15 Claims, 13 Drawing Sheets

(51) Int. Cl.
    *B60L 58/13*           (2019.01)
    *B60R 16/033*        (2006.01)
    *H02H 1/00*           (2006.01)
    *H02H 7/08*           (2006.01)
    *H02P 29/024*        (2016.01)
    *H02P 29/028*        (2016.01)
    *H02P 29/032*        (2016.01)

(52) U.S. Cl.
    CPC ........ H02H 1/0007 (2013.01); H02H 7/0833
        (2013.01); *F02N 11/0859* (2013.01); *F02N*
        *11/0862* (2013.01); *F02N 2011/0874*
        (2013.01); *F02N 2011/0881* (2013.01); *H02P*
        *29/027* (2013.01); *H02P 29/028* (2013.01);
        *H02P 29/032* (2016.02)

(56) References Cited

U.S. PATENT DOCUMENTS

| | | | | |
|---|---|---|---|---|
| 8,502,409 | B2* | 8/2013 | Kato | B60L 3/0069 307/9.1 |
| 8,598,837 | B2* | 12/2013 | Kitanaka | H02H 7/0838 318/801 |
| 8,614,872 | B2* | 12/2013 | Nakamura | H02M 3/156 361/93.1 |
| 8,829,710 | B2* | 9/2014 | Takahashi | F02N 11/0825 307/10.6 |
| 8,994,317 | B2* | 3/2015 | Akiyama | B60L 50/51 318/800 |
| 9,188,101 | B2* | 11/2015 | Sakakibara | B60R 16/03 |
| 9,242,611 | B2* | 1/2016 | Harada | B60R 16/03 |
| 9,487,089 | B2* | 11/2016 | Reichow | B60R 16/03 |
| 9,647,604 | B2* | 5/2017 | Arisawa | F04D 25/06 |
| 9,855,905 | B2* | 1/2018 | Nakajima | F02N 11/087 |
| 10,411,558 | B2* | 9/2019 | Forster | H02P 6/15 |
| 10,800,394 | B2* | 10/2020 | Kinoshita | F02N 11/10 |
| 10,921,374 | B2* | 2/2021 | Wada | H02J 7/0031 |
| 2005/0286181 | A1* | 12/2005 | Ochiai | B60L 3/0023 361/23 |
| 2010/0127663 | A1* | 5/2010 | Furukawa | B60L 50/51 320/134 |
| 2010/0289439 | A1* | 11/2010 | Kitanaka | B60L 3/0023 318/400.26 |
| 2011/0025251 | A1* | 2/2011 | Arai | B41J 19/202 318/685 |
| 2011/0128662 | A1* | 6/2011 | Kato | B60L 3/04 361/166 |
| 2011/0148426 | A1* | 6/2011 | Yokotani | H01M 10/48 324/434 |
| 2011/0298276 | A1* | 12/2011 | Takahashi | F02N 11/10 307/10.6 |
| 2012/0032660 | A1* | 2/2012 | Nakamura | H02M 3/156 323/288 |
| 2013/0088803 | A1* | 4/2013 | Kim | H02H 3/021 361/93.7 |
| 2013/0181515 | A1* | 7/2013 | Harada | F02N 11/04 307/10.6 |
| 2013/0257062 | A1* | 10/2013 | Sakakibara | F02N 11/0814 290/38 R |
| 2013/0257319 | A1* | 10/2013 | Akiyama | B60L 58/30 318/139 |
| 2013/0300193 | A1* | 11/2013 | Reichow | B60L 1/00 307/10.1 |
| 2014/0240872 | A1* | 8/2014 | Nomura | H02M 3/156 361/18 |
| 2014/0265558 | A1* | 9/2014 | Katayama | B60R 16/033 307/10.1 |
| 2015/0239411 | A1* | 8/2015 | Nakajima | F02N 11/0866 307/10.6 |
| 2016/0049896 | A1* | 2/2016 | Arisawa | F04D 25/08 318/504 |
| 2017/0125995 | A1* | 5/2017 | Nishi | H02J 7/00712 |
| 2017/0338755 | A1* | 11/2017 | Forster | H02P 6/28 |
| 2018/0238968 | A1* | 8/2018 | Wada | F02N 11/10 |
| 2019/0190512 | A1* | 6/2019 | Takuma | H02H 5/04 |
| 2019/0389449 | A1* | 12/2019 | Kinoshita | B60W 20/00 |
| 2019/0390641 | A1* | 12/2019 | Kinoshita | B60R 16/033 |
| 2020/0309079 | A1* | 10/2020 | Watanabe | F02N 11/087 |
| 2021/0184456 | A1* | 6/2021 | Suzuki | B60L 58/13 |

* cited by examiner

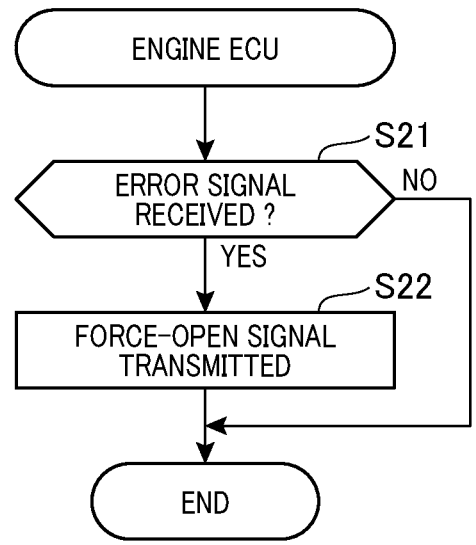
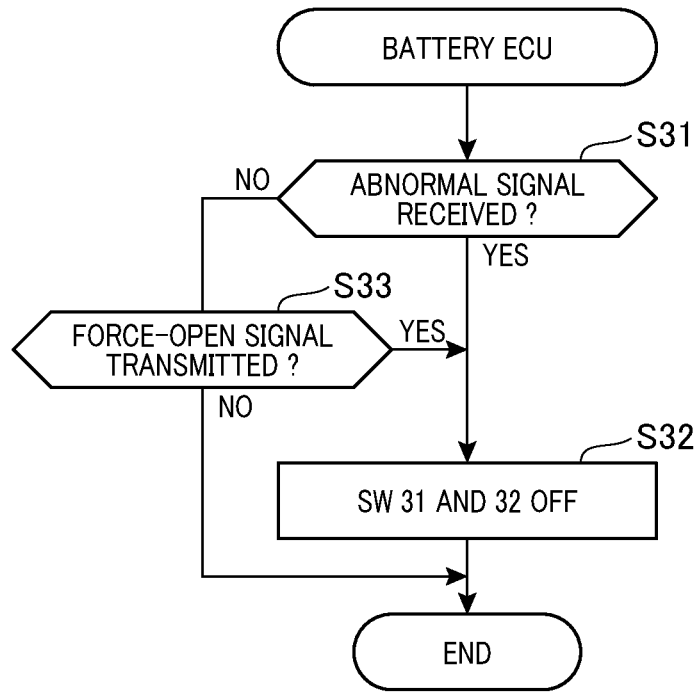

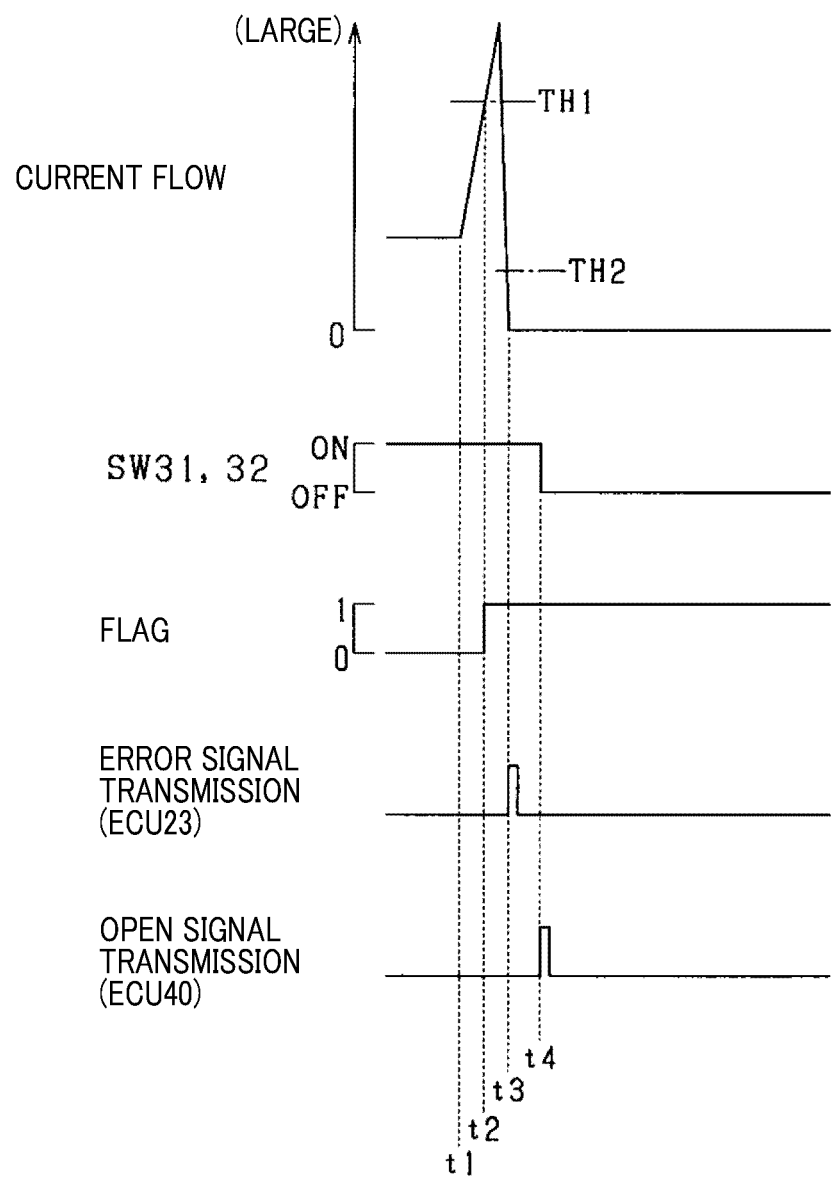

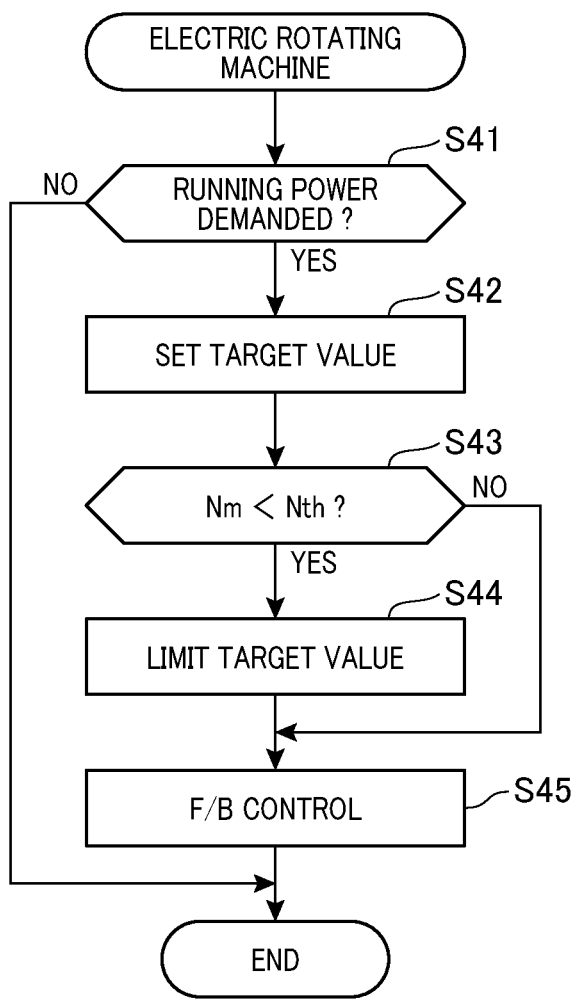

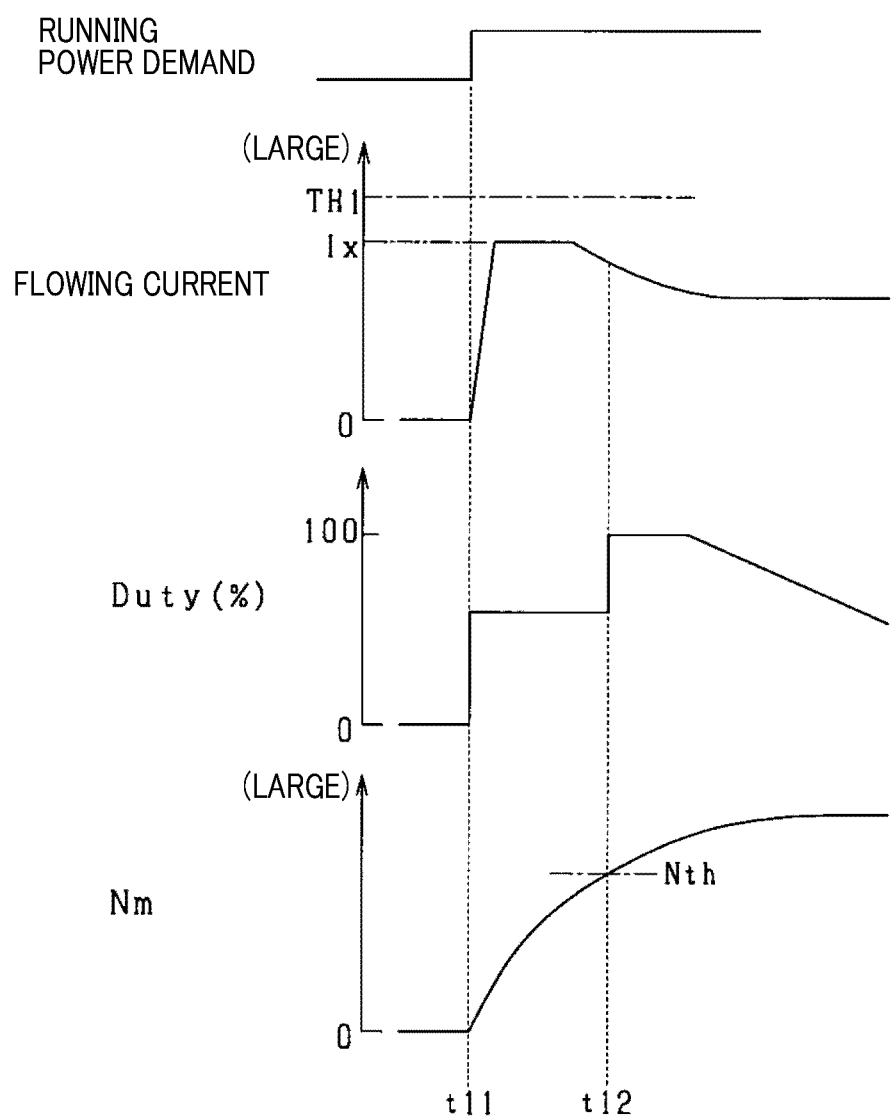

POWER CONTROL APPARATUS

This application is a U.S. National Phase Application under 35 U.S.C. 371 of international Application No. PCT/JP2017/035071 filed on Sep. 27, 2017. This application is based on and claims the benefit of priority from Japanese Patent Application no. 2016-194600, filed on Sep. 30, 2016. The entire disclosures of all of the above applications are incorporated herein by reference.

TECHNICAL FIELD

The present disclosure relates to a power system mounted in a vehicle, for example, and more specifically relates a power control apparatus that performs a control related to the power system.

RELATED ART

There are known conventional power systems for vehicles, for example, which are provided with a plurality of batteries (for example, a lead battery and a lithium ion battery) and each battery is provided with an electric rotating machine is serially connected in thereto (as described in Patent Literature 1). Furthermore, the electric rotating machine is provided so that, switching between a power generation state and power running state is operable, and an electrical state of each phase is adjusted during the power generation and the power running at an inverter.

For example, when a short circuit occurs in a power line and a ground line, caused by an overcurrent flowing to an inverter, there are issues of unfavorable events, such as a fault occurring in the inverter. In such cases, power which is supplied to the inverter from each of the batteries is terminated, and switches that are provided between the inverter and each battery are forcibly opened as a fail-safe process.

CITATIONS

Patent Literature

Patent Literature 1: JP2014-177213A

However, when an overcurrent flows to an inverter, it is necessary to decrease unfavorable events, which are caused by the overcurrent, and shutoff an electrical pathway at an earliest stage as a fail-safe process. For example, if a switch is shutoff when a large current is flowing along an electrical pathway, there are other concerns of the switch undergoing damage from a surge. It is considered that these unfavorable events are not limited to a power system equipped with a plurality of batteries. In consideration of the issues mentioned above, there is room to improve present techniques.

In view of the above issues, the present disclosure aims to provide a power control apparatus that takes appropriate measures when an overcurrent occurs.

A mode to resolve the above issues and a working effect thereof will now be described. Hereafter, symbols that correspond to a mode of the present disclosure are used for simplification. However, the present disclosure is not limited to the specified configuration shown with the symbols, for example.

SUMMARY

A first mode is a power control apparatus. The power control apparatus includes, an electric rotating machine enabling a working operation of power generation and power running;

a switching circuit that performs electricity for each phase at the electric rotating machine, by operably switching a plurality of switching elements ON/OFF state, a battery section electrically connected to the switching circuit, and switches mounted on an electrical pathway between the switching circuit and the battery section. The power control apparatus also includes a shutoff section that shuts off an electrical pathway if an overcurrent flows to at least one of the electric rotating machine and the switching circuit;

a first determination determining that a current flowing in the switching circuit has increased to a predetermined overcurrent threshold;

an overcurrent determination determining that the overcurrent has occurred, based on results of the first determination determining that the current flow flowing to the switching circuit has increased to the predetermined overcurrent threshold, and a second determination determining that thereafter, the current has decreased; and a switching control section that opens the switches based on the result of the overcurrent determination section.

In the configuration, the shutoff section is provided to shutoff the electrical pathway if the overcurrent occurs in, at least one of, the electric rotating machine and the switching circuit. In this case, after the current flow has increased due the overcurrent, it is then sharply decreased by shutting off the pathway at the shutoff section. When considering this aspect modality of the configuration described, determination that the overcurrent has occurred is based on the results of, the first determination which determines that the current flowing in the switching circuit has increased to the predetermined overcurrent threshold, and the second determination that determines that the current flow has decreased thereafter. Furthermore, the switches are opened based the determination results of whether the overcurrent has occurred. In this case, a current surge occurring with the opening of the switches is suppressed, and a current flow is desirably shutoff.

That is, if the switches provided on the electrical pathway are opened under conditions in which the overcurrent is flowing, a surge current is generated and the surge current may damage or brake the switches. However, in the configuration described above, since the switches are opened when the overcurrent has occurred, that is passed, the current surge that occurs with the opening of the switches is suppressed, and damage or breakage of the switches is also suppressed. As a further result appropriate measures can be taken when an overcurrent occurs.

As a second mode of the present disclosure, after the current flow increases to the overcurrent threshold, as the second determination, the overcurrent determination section determines that the current flow has decreased to a second threshold, which is lower than the overcurrent threshold.

According to the configuration, if an abnormal short circuit occurs at the electric rotating machine or the switching circuit, the increase of the current due to the overcurrent, and a decreased thereafter by shutting off the electrical pathway, at the shutoff section can be reliably performed. As a further result, a switch opening measure can be appropriately performed.

A third mode of the present disclosure is the switch controller that operatively opens the switches after a predetermined time period has passed when the overcurrent determination section determines that that the overcurrent has occurred. The predetermined time period is a period from when the current flow has decreased to the second threshold until a predetermined period has passed.

According to the configuration described above, when the determination of the overcurrent is performed according to a change, specifically an increase and decrease of the current flow, the switches are not provided to open immediately after the decrease of the current flow is determined, however, provided to open when the predetermined period of time has passed. In this case, changes in the current flow, indicate that the overcurrent has occurred, immediately after the electrical pathway is shutoff by the shutoff section. That is, it is considered that at least a temporary response that is related to the overcurrent is performed. Also, in this state, by performing the switch opening with sufficient time, an appropriate power shutoff measure can be performed. For example, taking into account that an electric shutoff affects other devices, a pre-measure, for example, relative to the electric shutoff may also be performed.

In a fourth mode, the power system has an electrical load that is connected to an electrical pathway between the battery section and the switching circuit, and a shutoff process section that performs a pre-process of the power shutoff, relative for the electrical load. The pre-process relative for the electrical load is performed from a time point in which the current flow decreases to the second threshold, until the predetermined time period has passed.

According to the configuration, when the current flow decreases to the second threshold, (that is, when the overcurrent is determined), an operation state of the electrical load is recorded, and a pre-process of decreasing an output, and terminating a driving operation can be executed, during a period from the decrease of the current flow until the switch opening is performed.

In a fifth mode of the present disclosure, the power system is provided with a first battery and a second battery as the battery section, and an electrical load is electrically connected to an electrical pathway that allows a power supply from each of the batteries. On the electrical pathway, a bypass pathway is provided to bypass the switches and electrically connect the first battery and the electrical load. The bypass pathway has bypass switches which are closed from the time point in which the current flow decreases to the second threshold, until the predetermined time has passed. The bypass switches are closed by a bypass section.

According to the configuration, when the current flow decreases to the second threshold (that is, if the overcurrent is determined) during the period from the decrease of the current flow until the switch opening is performed, the bypass path can be provided in a conduction state, while taking into account an operating time of the bypass switches. In this case, the power supply from the first battery to the electrical load can be continuously performed by using the bypass pathway, without shutting off power shutoff (omitted from the figures) relative to the electrical load.

In a sixth mode of the present disclosure, the power control apparatus further comprises a re-increase determination section which determines that the current flow has re-increased after a temporary decrease, when the overcurrent determination section determines that the overcurrent has occurred. In this mode, the switch control opens the switches when the overcurrent determination section determines that the overcurrent has occurred, and the re-increase determination section determines that the current flow has re-increased after the temporary decrease.

When the shutoff section is shutoff (for example, is fused) in response to an event of an abnormal short circuit occurring at the electric rotating machine or the switching circuit, a measure of terminating the overcurrent is completed. However, it is considered that the shutoff section returns to a conduction state, whereby electricity is in a conduction state, after the shutoff section is shutoff. According to the configuration, the opening of the switches is performed if, as a condition, the conduction returns. That is, after the overcurrent is determined by the respective first and second determination, the power shutoff by the opening of the switches is performed under limited conditions. According to the configuration, the effects to the other devices, for example, can be minimized, when the power is shutoff, which is performed by the opening of the switches.

In a seventh mode of the present disclosure the power control apparatus includes a first control device and a second control device. The first control device controls an operation of the power generation and the power running of the electric rotating machine, and the second control device controls charging of the battery section by the opening and closing the switches. The first device includes the overcurrent determination section, and transmits, to the second control device, a determination signal that indicates determination result of the overcurrent determination section. The second control device includes the switch controller and opens the switches based on the determination signal that is transmitted from the first control device.

According to the configuration, the first control device transmits, to the second control device, the determination signal that indicates the determination result of the overcurrent, and the second control device opens the switches based on the determination signal from the first control device. In this case, since the second control device directly receives the determination signal from the first control device, a swift measure can be taken in response, on the basis of the determination signal.

In an eight mode of the disclosure, the power control apparatus is connected to a third control device to allow mutual communication therebetween. The third control device generally manages the first control device and the second control device. The first control device transmits the determination signal to the second control device and the third control device, and the third control device transmits, to the second control device, a force opening signal that instructs forcible opening of the switches that is based on the determination signal received from the first control device. The second control device forcibly opens the switches based on an earlier received signal among the determination signal that is received from the first device and the force-open signal received from the third control device.

According to the configuration, the second control device directly receives the determination signal from the first control device, without waiting to receive the force open signal from the third control device that is a host control device. A swift measure can be therefore taken, in response, on the basis of the determination signal. In addition, the second control device can perform an early response, and the third control device can perform a highly reliable response. It is noted that the second control device executes a local operation process that is relative to a charging control of a charger, and the third control device generally manages other control devices, thus a highly reliable response is executed by the third control device.

A ninth mode of the present disclosure is the shutoff portion that is configured as a narrow portion of a lead section connecting the switching element of the switching circuit to a mounting position.

According to the configuration, if the abnormal short circuit of the electric rotating machine or the switching circuit occurs, the measure for the overcurrent is promptly executed by shutting off the lead portion of the switching element.

BRIEF DESCRIPTION OF DRAWINGS

The purpose of the disclosure described above and other purposes, in addition to features and advantages thereof will become transparent with description described hereinafter with reference to drawings.

In the accompanying drawings;

FIG. 5 is a flowchart showing a process of abnormal monitoring executed by an engine ECU;

FIG. 6 is a flowchart showing a process of a failsafe control executed by a battery ECU;

FIG. 7 is a time chart describing a process when an overcurrent occurs at an inverter;

FIG. 8 is a flowchart showing a process of a power running drive control of the electric rotating machine;

FIG. 9 is time chart showing a current flow control at an initial start of the power running drive control of the electric rotating machine;

EMBODIMENTS OF THE DISCLOSURE

First Embodiment

Hereafter, embodiments of the present disclosure are described based on drawings. In a first embodiment, a power system for mounting in a vehicle is described. The power system supplies power to each device in the vehicle when the vehicle is travelling with an engine (internal combustion engine) supplying a driving power.

Figure 1:
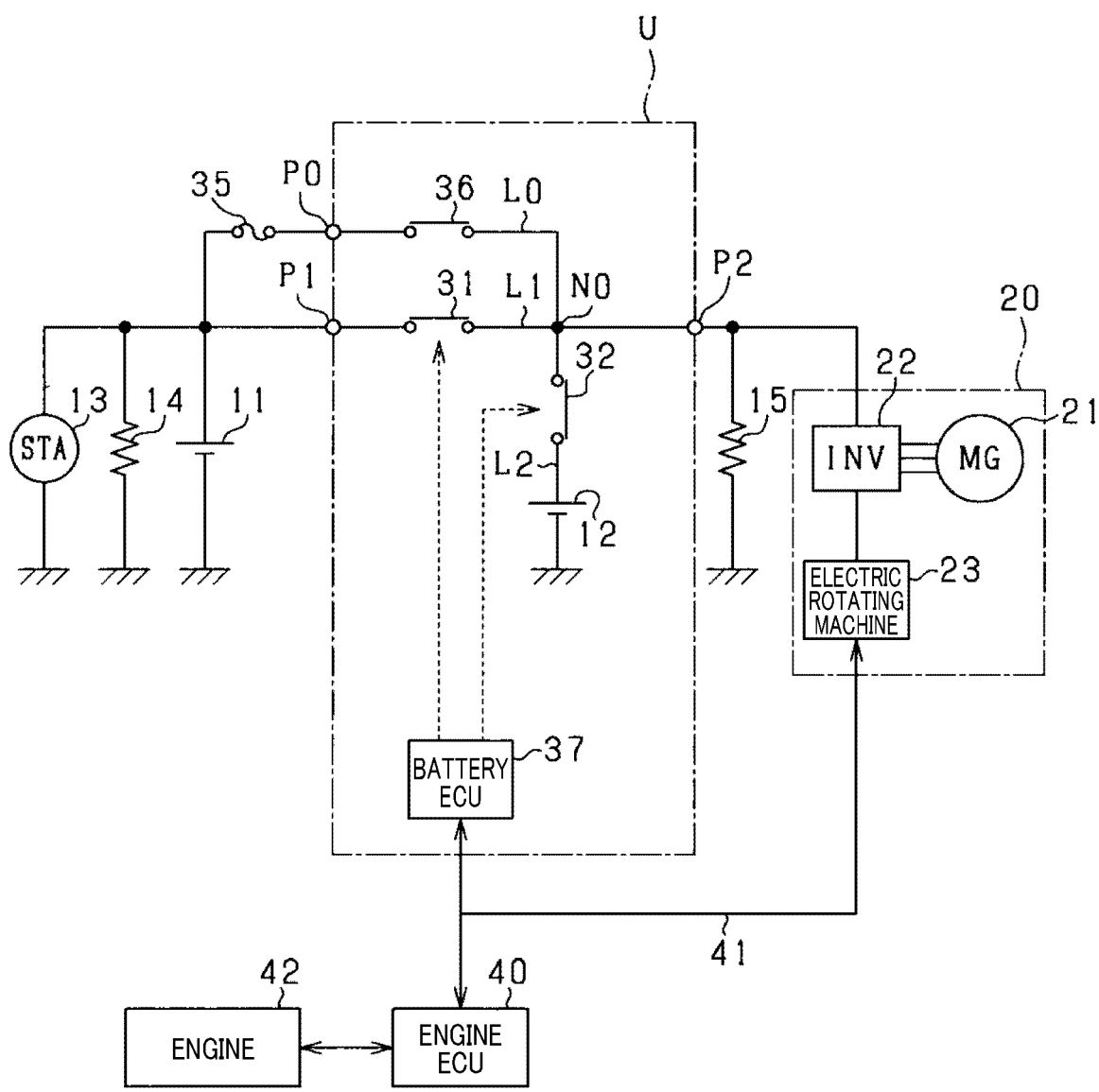
FIG. 1 is a diagram of an electrical circuit showing a power system of a first embodiment.

As shown in FIG. 1, the power system of the present disclosure is a second power system that is provided with a lead battery 11, as a first battery, and a lithium-ion battery, as a second battery. Power can be supplied from each of the batteries 11 and 12 to a starter 13, electrical loads 14 and 15, and an electric rotating machine unit 20. Additionally, the electric rotating machine unit 20 can perform charging to the batteries 11 and 12. In this system, the lead battery 11 and the lithium battery 12 are electrically connected in parallel to the electric rotating machine unit 20, and also electrically connected in parallel to the electrical loads 14 and 15.

The lead battery 11 is a known universal battery. The lithium-ion battery 10 has a small power loss when charging or discharging, and is a high-density battery with a high output density and high energy density, compared to the lead battery 11. The lithium ion battery 12 preferably has higher energy efficiency when charging or discharging compared to the lead battery 11. Also, the lithium-ion battery 12 is configured as pair of batteries each having a plurality of single batteries. Both batteries 11 and 12 have a same rated voltage that is 12V, for example.

Although specific details are omitted from the drawings, the lithium battery 12 is configured as battery unit U that is a unified substrate accommodated in an accommodating case. The battery unit U includes output terminals P1, P2 and P0. Among these terminals, the lead battery 11, the starter 13 and the electrical load 14 are connected to the output terminals P1 and P0, and the electrical load 15 and the electric rotating machine unit 20 are connected to the output terminal P2.

Each of the electrical loads 14 and 15 require different voltages from the supplied power that is supplied from the batteries 11 and 12. The electrical load 14 contains a stable voltage requirement load that requires the voltage of the power supply to be constant or have stability and that is changeable within at least a predetermined voltage range. In contrast, the electrical load 15 is a general electrical load other than the stable voltage requirement load. The electrical load 14 may also be called a cover protection load. The electrical load 14 can not tolerate a fall in power, and the electrical load 15 tolerates a fall in power compared to the electrical load 14.

The electrical load 14, which is the stable voltage requirement load, is a navigation apparatus and an audio apparatus, a meter device, and an engine ECU, for example. In this case, by suppressing a change in a voltage of the power supply, an occurrence of unnecessary resetting of the above mentioned apparatuses and devices, for example, is suppressed, and stable operation can be realized. The electrical load 14 may also include actuators that are used when the vehicle is running, for example, an electrical steering device and a brake device. The electrical load 15 can be a sheet heater, a defrost heater for rear window, a head light, a front window wiper and a fan for an air conditioner, for example.

The electric rotating machine unit 20 is provided with the electric rotating machine 21, as a three phase alternate motor, an inverter 22 as power converter device (switching circuit), and an ECU 23 for an electric rotating machine controlling an operation of the electric motor 21. The electric rotating machine unit 20 is a generator equipped with a motor that is configured as an Integrated Starter Generator (ISG).

Figure 2:
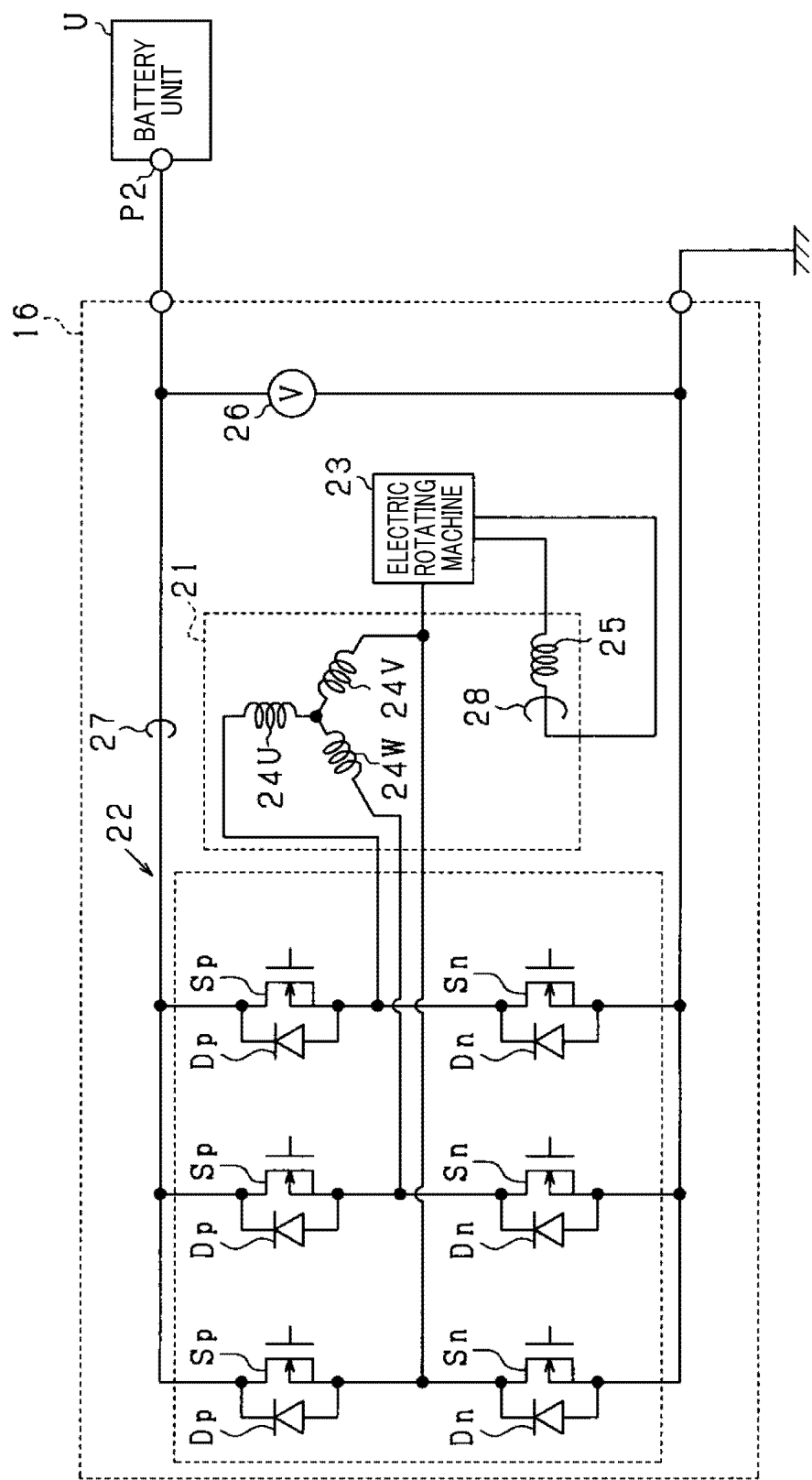
FIG. 2 is a circuit drawing showing an electrical configuration of an electric rotating machine unit.

An electrical configuration of the electric rotating machine unit 20 will now be described with reference to 2 FIG. 2. The electric rotating machine 21 is provided with a three phase electric winding, specifically a U phase, a V phase and W phase that are a phase winding of a respective 24U, 24V and 24W, and also a magnetic field winding 25. Each of the phase windings 24U, 24V and 24W is star connected and connected to each other at a neutral point.

A rotation shaft of the electric rotating machine 21 is drive connected by a belt to an output shaft of the engine that is not shown in the drawings. The rotation shaft of the electric rotating machine 21 rotates by rotation of the engine output shaft, and contrastingly, the engine output shaft rotates by the rotation of the electric rotating machine 21. That is, the electric rotating machine 21 is equipped with a generation function that generates power (power regeneration) by the rotation of the engine output shaft and wheel axle, and a power running function that provides rotation power to the output shaft of the engine. For example, moving power assistance for restarting the engine during idling stop control and vehicle speed is power driven by the electric rotating machine 21.

The inverter 22 converts an alternating current voltage output from the phase windings 24U, 24V and 24W to a direct current voltage and outputs to the battery unit U. The inverter 22 also converts the direct voltage input from the battery unit U to an alternate voltage and outputs to the phase windings 24U, 24V and 24W. The inverter 22 is a bridge circuit, which includes the same number of an upper and a lower arms as the number of phases for the phase windings, and configures a three-phase wave rectification circuit. The inverter 22 configures a drive circuit that drives the electric rotating machine 21 by adjusting power that is supplied from the electric rotating machine 21.

The inverter 22 is provided with an upper arm switch Sp and a lower arm switch Sn for each phase. Communication is performed for each phase by switching each of the switches Sp and Sn to an ON/OFF state. In the first embodiment, a voltage control type semi-conductor switching element is used for the switches Sp and Sn. Specifically, an N channel MOSFET is used.

An upper arm diode Dp is reverse parallel-connected to the upper arm Sp, and a lower arm Dn is a reverse parallel-connected the lower arm Sn. In the first embodiment, body diodes of the respective Sp and Sn switches are used as the diodes Dp and Dn. It is noted that the Dp and Dn are not limited to the body diodes, and, for example, a diode component other than the Sp and Sn switch may also be employed.

Figure 3:
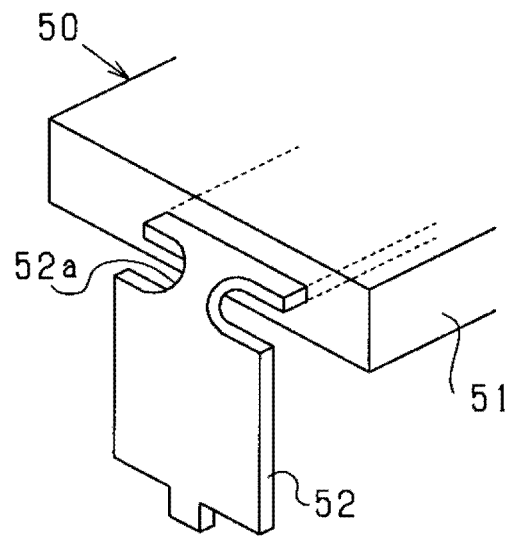
FIG. 3 is diagram showing a perspective view showing a part of a switch module.

Supplementary description of the configuration of the switches Sp and Sn will be provided. FIG. 3 shows a perspective view of a section of the switch module 50 that configures the switches Sp and Sn. The switch module 50 is electrically connected to a main body 51, which is configured of a semi-conductor switching element and surrounding circuits provided in a resin mold, and also the semi-conductor elements, and is provided with a lead portion 52 (bus bar) protruding from as side of the main body 51. The lead portion 52 is mounted, at a front portion thereof, onto a predetermined mounting position of a plate, for example, by welding. That is, a narrow part 52a is formed on a part of the lead portion 52. Therefore, when an extremely large current (an overcurrent) flows to the switching module 50 via the lead portion 52, the narrow part 52a is fused by heat.

A neutral connection point of each serially connected switch Sp and Sn is connected to an end of each phase winding 24U, 24V and 24W. Also, a voltage sensor 26 that detects an input and an output voltage of the inverter 22 is provided between a high voltage-side pathway and a low voltage-side path of the inverter 22. A current sensor 27 that detects a current flowing along the conductive pathway of the inverter 22, and a current sensor 28 that detects a current flowing to the magnetic winding 25, for example are also configured on the rotor electric unit 20.

It is noted that the current sensor 25 may also be configured between the inverter 22 and the phase windings 24U, 24V and 24W, or configured for each phase between the lower arm switch Sn and a ground line. Furthermore, detected signals for each of the sensors 26 to 28 are appropriately input into the ECU 23 for the electric rotating machine. The electric rotating machine 21 is provided with a rotor angle sensor which detects angle information of the rotor, and the inverter 22 is provided with a signal processing pathway which processes signals that are transmitted from the rotor angle sensor.

The ECU 23 for the electric rotating machine is configured of microcomputer that includes a central processing unit (CPU), a read only memory (ROM), a random access memory (RAM) and input and output interface, for example. The ECU 23 for the electric rotating machine adjusts an excitation current that flows to the magnetic field winding 25 by an IC regulator, not shown in the figures, inside the ECU. As a result, a power voltage of the electric rotating machine unit 20 (output voltage that corresponds to a battery unit U) is controlled. The ECU 23 for the electric rotating machine controls the current flow by controlling ON/OFF state of each phase switch Sp and Sn, according to a conduction phase angle, and by adjusting an ON/OFF STATE ratio when each phase is conducted (for example, duty ratio). In this regard, the ECU 23 for the electric rotating machine controls the inverter 22 after the vehicle starts running, in order to drive the electric rotating machine 21, and assists a driving power of the engine. The electric rotating machine 21 can provide an initial rotation to the crankshaft when the engine is started, and also has a function of an engine starting apparatus.

Next, an electrical configuration of the batter unit U will be described. As shown in FIG. 1, the battery unit U has an electrical path L1 that joins the output terminals P1 and P2, and an electrical path L2 that joins a connection point NO above the electrical pathway L1 and the lithium-ion battery 12, configured as an inner-unit electrical pathway. Among the above mentioned pathways, a switch 31 is mounted on the electrical pathway L1, and a switch 32 is mounted on the electrical pathway L2. It is noted that the electrical pathway that connects the lead battery 11 to the lithium-ion battery 12 has the switch 31 that is mounted on a side closer to the lead battery 11 than a position of the connection point NO to the lead battery, and the switch 32 that is mounted on a closer to the lithium ion-battery 12, than the connection point NO to the lithium-ion battery 12. The connection point NO connects the electric rotating machine unit 20 on the electrical pathway to the batteries 11 and 12.

The respective switches 31 and 32 are provided with 2×n MOSFET (semi-conductor switching elements), for example, which includes two parasitic diodes for one MOSFET pair. The parasitic diodes are serially connected to face opposed directions. A current that flows on the respective pathways in which the switches 31 and 32 are mounted is completely shut off by the parasitic diodes when the switches 31 and 32 are switched a shutoff sate. It is noted that a MOSFET, an IGBT or a bipolar transistor, for example, can be used as the switches 31 and 32. In the case of using the IGBT or the bipolar transistor, diodes that are serially connected to face opposed directions of the switches 31 and 32 can be alternatively used to the parasitic diodes.

The battery unit U is provided with a bypass pathway L0 that bypasses the switch 31. The bypass pathway L0 is configured to connect to the output terminal P0 and the NO connection point of the electrical pathway L1. The output terminal P0 is connected to the lead battery 11 via a fuse 35. The connection between the lead battery 11, the electrical load 15 and the electric rotating machine unit 20, may be performed by the bypass pathway L0, without passing through the switch 31. A bypass switch 36 is formed from a constitutive closed-type machinery relay, for example, is disposed on the bypass pathway L0. The lead battery 11, electrical load 15 and the electric rotating machine unit 20 are electrically connected, by switching the bypass switch 36 ON (closed) even when the switch 31 is switched OFF (open state).

The battery unit U includes the battery ECU 37 that controls the ON/OFF state (open/close) states of the switches 31 and 32. The battery ECU 37 is configured of microcomputer that includes a central processing unit (CPU), a read only memory (ROM), a random access memory (RAM) and input and output interface, for example. The battery ECU 37 controls a charged state of the batteries 11 and 12, and the ON/OFF state of the switches 31 and 32 based on a command value from the engine ECU 40 that is the host control apparatus.

As a result, the charging of the lead battery 11 and the lithium-ion battery 12 can be selectively performed. For example, the battery ECU 37 calculates a state of charge (remaining volume: SOC) of the lithium-ion battery 12 and controls a charging volume and discharging volume to the lithium-ion battery 12, so that the SOC is maintained in a predetermined using range.

The engine ECU 40 is a host control apparatus that generally manages the ECU 23 for the electric rotating machine of the electric rotating machine unit 20 and the battery ECU 37 of the battery unit. The engine ECU 40 is configured of microcomputer that includes a central processing unit (CPU), a read only memory (ROM), a random access memory (RAM) and input and output interface, for example, and controls an operation of an engine 42 based on each engine operation state and the vehicle running state. The engine ECU 40 has a function that executes an idling stop control. The idling stop control is provided to automatically stop the engine when a known predetermined automatic stop condition is met and then re-start the engine when a predetermined re-starting condition is met when the vehicle is in the automatic stop-state.

Each ECU 23, 37 and 40, in addition to other ECUs which are mounted in the vehicle and not shown in the figures, are connected to each other via a communication line 41 that constructs communication network, such as CAN, and are provided to communicate with each other, by communicating in both direction at a predetermined cycle. Each type of data that is stored in each of the ECUs, that is the ECU 23, 37 and 40 can be shared with another ECU. It is noted that inverter 22 and the ECU 23 for the electric rotating machine is the first control apparatus, the battery ECU 37 is the second control apparatus, and the engine ECU 40 is the third control apparatus. The communication line 41 is a signal transmission section.

Incidentally, there is a concern of a closing failure occurring in the switches Sp and Sn that are provided in the inverter 22. For example, if an upper arm switch Sp closing failure and a lower arm Sn closing failure occurs for the same phase, a situation in which an overcurrent flows to the Sp and Sn switches may thus arise as a consequence. In this case, even if the overcurrent flows to the switches Sp and Sn, the narrow part 52a of the lead portion 52 of the switch module 50 is fused and continuous flow of the overcurrent is therefore suppressed.

It is noted that a short circuit may also occur at a location other than the inverter 11. That is, there is also a risk of a short circuit occurring in the electric rotating machine 21 of the electric rotating machine unit 20. For example, if a short circuit occurs in either one of the phase windings 24U, 24V and 24W, an overcurrent is likely to flow to the switches Sp and Sn of the inverter 22.

In the present embodiment, when the lead portion 52 is fused due to the overcurrent, in turn, the fusing causes the current that flows in the electrical pathway to sharply decrease from a large current. Since the current has decreased, the failsafe process of the battery unit U is conducted by forcible opening of the switches 31 and 32, with the current maintained in the decreased state. In this case, the power supply from the lead battery 11 and the lithium-ion battery 12 to the inverter 22 is terminated by the opening of the switches 31 and 32. In the present embodiment, the ECU 23 for the electric rotating machine determines that the overcurrent has occurred in the inverter 22 based on a result of a first determination that determines the current flowing to the inverter 22 has increased to a predetermined overcurrent threshold, and a second determination that determines the current is then decreased. Also, the battery ECU 37 opens the switches 31 and 32 (switch controller) based on the results of the overcurrent determination that is determined by the ECU 23 for the electric rotating machine.

The engine ECU 40 serves as the host ECU among the ECUs 23, 37 and 40. The control of electric rotating machine by the ECU 23 for the electric rotating machine and the charging and discharging control by the battery ECU 37 is executed based on a command of the engine ECU 40. From the circumstances, if an abnormal overcurrent in the inverter 22 occurs, once the occurrence of the abnormal overcurrent is determined at the ECU 23 for the electric rotating machine, firstly, an error signal is transmitted to the engine ECU 40, and a failsafe signal that corresponds to an error signal is transmitted to the battery ECU 37 via the communication line 41.

In this case, after the abnormality occurs, that is the overcurrent, communication from the ECU 23 for the electric rotating machine to the engine ECU 40, and then from the engine ECU 40 to the battery ECU 37 is performed, and the switch opening (failsafe process) at the battery unit U is then executed. From the above, considering that time is required from the time point in which the abnormality occurs until the switch is opened, a situation of secondary unfavorable events occurring is also a concern. For example, if dispersed communication is performed between the ECUs, it is likely that a time needed to open the switch is prolonged.

In this regard, in the first embodiment, since the ECUs 23, 37 and 40 are configured to communicate with each other by the communication line 41, the following the configuration is employed.

(d1) The ECU 23 for the electric rotating machine transmits an abnormal overcurrent signal to the battery ECU 37 and the engine ECU 40 and thus indicates that the overcurrent has occurred in the inverter 22.

(2) The engine ECU 40 transmits the force-open signal relative to the battery ECU 37 to forcibly open the switches 32 and 31, based on the abnormal overcurrent signal that is received from the ECU 23 for the electric rotating machine.

(3) The battery ECU 37 forcibly opens the switches 31 and 32 based on, the earlier received signal, between receiving the abnormal overcurrent signal from the ECU 23 for the electric rotating machine and receiving the force open signal from the engine ECU 40.

In this case, the battery ECU 37 can directly receive the abnormal overcurrent signal from the ECU 23 for the electric rotating machine, without waiting to receive the force open signal from the engine ECU 40, and in response, swift measures can be taken based on the abnormal overcurrent signal.

Also, as described herein above, if the overcurrent occurs as a consequence of the short circuit in the inverter 22, a large current is generated as a rush current at the initial start of the running power drive of the electric rotating machine 21. In this case, if the rush current is detected as the large current, this can be erroneously determined as the overcurrent, and consequently occurrence of an abnormal short circuit (specifically, abnormal overcurrent) is then erroneously determined.

In this first embodiment, the ECU 23 for the electric rotating machine limits the occurrence of the rush current with the start of the driving at the initial start of the power running drive of the electric rotating machine 21. By limiting the rush current to a current that is smaller than an overcurrent determination value, a rush current and an overcurrent can be clearly distinguished.

That is, at the initial start of the power running drive of the electric rotating machine 21, ECU 23 limits a target current value to a predetermined limited value, and a feedback control of the current flow in the inverter 22 is performed based on the limited target value. For example, the overcurrent determination value is set at 400 A and the limited value limit set at 300 A. In this case, it is considered that, a large current that exceeds the overcurrent determination value will flow, as a rush current, if the current limitation is not performed, therefore, by implementing the current limitation, a rush current is maintained at a smaller current value than the overcurrent determination value.

Also, at the initial start of the running power drive of the electric rotating machine 21, the neutral point voltage is increased by an electromotive force of a motor due to an increase in the rotating speed of the electric rotating machine 21. The rush current is thus gradually decreased. At the initial start of the power running drive of the electric rotating machine 21, the ECU 23 for the electric rotating machine releases the limit of the target current value based on the rotating speed of the electric rotating machine 21 that has increased to a predetermined rotating speed.

Next a calculation process that is performed by each respective ECU 23, 37 and 40 will be described using a flow chart, for example.

Figure 4:
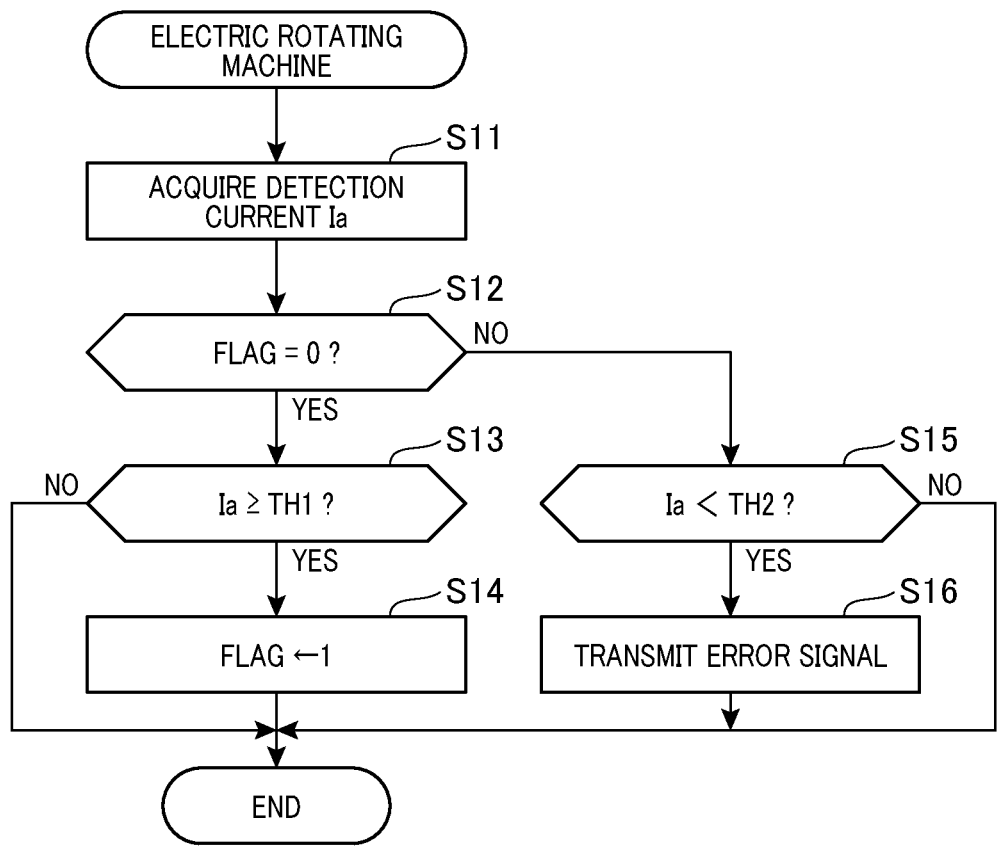
FIG. 4 is a flowchart showing a process of an abnormal overcurrent determination executed by an electric rotating machine ECU.

FIG. 4 is a flowchart showing a process of the abnormal overcurrent determination. The present process is repeatedly executed at predetermined cycles by the ECU 23 for the electric rotating machine.

In FIG. 4, at step S11 a detected current Ia that is detected by the current sensor 27 is acquired. Next at step S12, it is determined whether a flag is '0' that indicates the occurrence of the overcurrent at the inverter 22. If the flag=0, the process moves to step S13 and it is determined whether the detected current Ia is equal to greater than a first threshold TH1. The first threshold TH1 is an overcurrent threshold. For example, TH1 is 400 A. If the detected current Ia is less than the first threshold, the process is ended. If, however the detected current Ia is equal to or higher than the first threshold, the process moves to step S14, and after the flag is set to 1, the process is ended.

After the flag is set to 1, the result at step S12 is NO and the process moves to step S15. At step S15, it is determined whether the detected current is less than a predetermined second threshold TH2. The second threshold TH2 is calculated as a smaller current value than the first threshold TH1, that is the TH2=200 A, for example.

If the detected current Ia is equal to or higher than the second threshold TH2, the process is ended. However, if the detected current is less than the second threshold TH2, the process moves to step S16. At step S16 the abnormal overcurrent signal is transmitted to the battery ECU 37 and the engine ECU 40 using the communication line 41 and then the process is ended.

FIG. 5 is flowchart showing an abnormal monitoring process. This process is repeatedly executed at predetermined cycles by the engine ECU 40.

In FIG. 5, at step S21, it is determined whether the abnormal overcurrent signal is received from the ECU 23 for the electric rotating machine. If the abnormal overcurrent signal is received, the process moves to step S22 and the force-open signal of the switches 31 and 32 is transmitted to the batter ECU 37.

FIG. 6 is a process for the failsafe control of the battery unit U that is repeatedly executed by the battery ECU 37 at predetermined cycles.

In FIG. 6, at step S31 it is determined whether the abnormal overcurrent signal is received from the ECU 23 for the electric rotating machine. If the abnormal overcurrent signal is received, the process moves to step S32 and a command to switch OFF (open) the switches 31 and 32 is performed as a failsafe process. It is noted that the bypass switch 36 remains in the open state.

In contrast, if the abnormal overcurrent signal is not received, the process moves to step S33, and it is determined whether the force-open signal from the engine ECU 40 is received. If the force-open switch signal is received, the process moves to step S32 and the failsafe process is executed. According to steps S31 to S33, in this process, the failsafe process is executed based on a first received signal among the abnormal overcurrent signal from the ECU 23 for the electric rotating machine, and the force-open signal from the engine ECU 40.

Next a detailed process that is executed when the overcurrent occurs at the inverter 22 will be described using a time chart shown in FIG. 7.

In FIG. 7, before a timing t1 the switches Sp and Sn of the inverter 22 are switched ON/OFF state according to an operation demand of the electric rotating machine 21. The current flow flows in the inverter 22 according to an operating state of the electric rotating machine 21. That is, the electric rotating machine unit 20 is working normally. In this state, the current that flows in the inverter, (the detected current Ia detected by the current sensor 27) is lower than the first threshold TH1. At this point, the switches 31 and 32 in the battery unit U are in a closed state (in some cases only one of the two switches is closed).

At a timing t1, when the current flow suddenly increases in the inverter 22 by the occurrence of a short circuit at the inverter 22, for example, at a timing t2, the current flow exceeds the first threshold TH1. As a result, the flag is set to 1. By the flow of the overcurrent to the switches Sp and Sn, the narrow part 52a of the lead portion 52 provided on the switch module 50 is fused, and as a consequence the current is sharply decreased.

Thereafter, at timing t3, the current flow falls below the second threshold TH2, and the overcurrent error signal is output from the ECU 23 for the electric rotating machine. Then at a timing t4, the battery ECU 37 of the battery unit recognizes the occurrence of the overcurrent at the electric rotating machine unit 20 based on the abnormal overcurrent signal that is received from the ECU 23 for the electric rotating machine. The failsafe process, specifically the force-opening of the switches 31 and 32 is thus performed.

At timing t4 the current flow is maintained as a small current, and the switches 31 and 32 can be desirably opened whilst protecting the switches 31 and 32. That is, in a situation of the overcurrent flowing, there is a concern of a surge current occurring on the current flowing pathway if the switches 31 and 32 are opened, and this current surge may cause, for example, the switches 31 and 32 to be broken or damaged.

In this regard, according to the configuration described above, since the opening of the switches 31 and 32 is performed once the overcurrent has settled, the current surge that occurs with the opening of the switch is suppressed, and damaging or braking of the switch occurring is also suppressed.

It is noted that the switches 31 and 32 are forcibly opened by the failsafe process, and the bypass switch 36 is maintained in the open state, in the first embodiment. However, a failsafe process in which the switches 31 and 32 are forcibly opened, and the bypass switch 36 is closed may also be provided. If the bypass switch is maintained in the open state, the lead battery 11 and the inverter 22 are completely shutoff by the opening the switches 31 and 32. In contrast, if the bypass switch 36 is closed, the lead battery 11 and the inverter 22 are connected via the fuse 35.

At this point, the engine ECU 40 recognizes the occurrence of the overcurrent based on receiving the abnormal overcurrent signal at the timing t4 (or before or after t4), and the force-open signal is thus transmitted to the battery ECU 37. As a result, a configuration in which the failsafe process is executed at the battery unit U after waiting for the command from the engine ECU 30, which is the host ECU, and in this case, the failsafe process is executed after the timing t4. However, in the first embodiment, since the battery ECU 37 executes the failsafe process based on the abnormal overcurrent signal from the ECU 23 for the electric rotating machine, without waiting to receive the force-open signal from the engine ECU 40, a measure can be performed at an earlier stage.

Next the limitation process of the rush current at the initial start of the power running drive of the electric rotating machine 21 will be described. FIG. 8 is a flowchart showing a process of the power running drive of the electric rotating machine 21. This process is repeatedly executed at predetermined cycles by the ECU 23 for the electric rotating machine.

In FIG. 8 at step S41, it is determined whether the power running drive is demanded. For example, it is determined that the power running drive is demanded at the re-start of the engine or at the power moving assistance. If there is demand for the power running drive, the process moves to step S42, but if however there is no demand, the process is ended.

At step S42, the target value of an inverter current flow is set based on a demanded driving state relative to the electric rotating machine 21. At this point, the target value of the inverter current flow is set on the basis of an initial rotating speed (cranking speed) to re-start the engine, if at that particular point the engine is started, for example.

At step S43, it is determined whether the rotation speed Nm of the electric rotating machine is less than a predetermined rotation speed Nth. The predetermined rotation speed Nth is a determination value which determines that, by the electromotive force of the motor, the neutral point voltage has increased to a predetermined value at the electric motor 21. The predetermined rotation speed Nth is 400 rpm, for example. The process moves to step S44 with a condition of Nm<th.

At step S44, by limiting the rush current at the initial start of the power running drive of the electric rotating machine 21, the target value of the inverter current flow is limited to a limitation value Ix. The limitation value Ix is a value that is smaller than the first threshold, provided for the overcurrent determination at the inverter 22, for example, the limitation value is Ix=300 A. In this case, the limitation value Ix can be set according to whether the power supply driving demand, at that time, is either an engine re-start demand or a moving assistance demand. For example, in the case of the engine re-starting demand, the limitation value is set to a smaller value than the moving assistance demand.

Thereafter, at step S45, a feedback control related to the inverter current flow is performed. A control duty is calculated based on a deviation between the target value of the inverter current flow and an actual value (that is a detected current Ia). The switching control of the Sp and Sn switches of the inverter 22 is performed based on the duty control.

FIG. 9 is a time chart showing the current control at the initial start of the running power drive of the rotor 21. The engine re-start point will now be described.

In FIG. 9 at timing t11, a request of the power supply drive of the electric rotating machine 21 arises and the current of the inverter 22 is thus initiated (engine re-start is demanded). At this point, firstly the target value of the inverter current flow is limited to Ix, and the feedback control of the inverter current flow is performed with Ix as the target value. Since the inverter current flow is limited to the smaller value than the first threshold TH1 for the overcurrent determination, the occurrence of erroneous determination, caused by the rush current which indicates that the overcurrent has occurred can be decreased. It is noted that in situations when the feedback control is performed without performing the current limitation, conduction of the switches Sp and Sn is performed at 100% duty, and at this point, a large rush current flows.

Thereafter, the rotation speed Nm of the electric rotating machine 21 is increased, and at timing t12 once the rotation speed Nm reaches the predetermined speed Nth, the current limitation of the inverter 22 is released. At the timing t12, the erroneous determination of the overcurrent is resolved. That is, as shown in FIG. 9, at the timing t12, even when the conduction of the switches Sp and Sn is 100% duty, the erroneous determination of the overcurrent will not occur. From the timing t12, the feedback control of the inverter current flow is performed in accordance with the requested driving state, relative to the electric rotating machine 21.

Effects obtained from the first embodiment will now be described.

In a configuration where the narrow part the narrow part 52a of the lead portion 52 is fused when an overcurrent flows in the electric rotating machine 21 or the inverter 22, once the current flow has increased due to the abnormal overcurrent, the current is then sharply decreased by the shutoff of the pathway since the narrow portion 52a is fused. In this case, determination of the overcurrent occurring is based the results of the first determination which determines the inverter current flow has increased to the first threshold TH1, and the second determination that determines the current has then decreased. The switches 31 and 32 are the opened, on the basis of the determination results.

Also, while suppressing a current surge that occurs with the opening of the switches 31 and 32, a current flow can be desirably shutoff. As a result, appropriate measures can be taken when an overcurrent occurs.

In the configuration, after the inverter current flow has increased to the first threshold TH1, the second determination determines that the current has decreased. In this case, it is determined that the current flow has decreased to the second threshold TH2, which is smaller than the first threshold. As a consequence, when an abnormal short circuit occurs in the inverter 22, the increase of the current due to the occurrence of the overcurrent, and the decreased of the current caused by the shutoff of the pathway can be reliably determined. Furthermore, the switch opening measure can be appropriately elicited.

The ECU 23 for the electric rotating machine transmits the determination signal (abnormal overcurrent signal) that reflects the result of the overcurrent determination. The battery ECU 37 opens the switches 31 and 32 based on the determination signal from the ECU 23 for the electric rotating machine. In this case, the battery ECU 37 can perform a swift measure based on the determination signal that is directly received from the ECU 23 for the electric rotating machine.

More specifically, in the configuration;

(1) The ECU 23 for the electric rotating machine transmits to the battery ECU 37 and the engine ECU 40, the determination signal that indicates the result of the overcurrent determination (abnormal overcurrent signal).

(2) The engine ECU 40 transmits the force-open signal to forcibly open the switches to the battery ECU 37, based on the determination signal received from the ECU 23 for the electric rotating machine.

(3) The battery ECU 37 forcibly opens the switches 31 and 32 on the basis of the earlier received signal, among the determination signal received from the ECU 23 for the electric rotating machine and the force-open signal received from the engine ECU 40.

According to the configuration, the battery ECU 37 directly receives the determination signal from the ECU 23 for the electric rotating machine, and in response performs a swift measure, based on the determination signal, without waiting to receive the force-open signal from the engine ECU 40 that is the host ECU. In addition to the battery ECU 37 that can execute an early response, the engine ECU 40 can also perform a highly reliable response. It is noted that in the engine ECU 40 generally manages other ECUs, in contrast to the battery ECU 37 which can perform the local operation process and is subject to the charging and discharging of the batteries 11 and 12, therefore, the engine ECU 40 elicits a response that has high reliability.

The inverter 22 is provided with the narrow part 52a (shutoff portion) of the lead portion 52, in the switching module 50. Therefore, when the overcurrent flows in the inverter 22, the overcurrent measure can be immediately performed.

There is also provided, the limitation of the rush current that occurs at the start of the driving, when the power running drive of the electric rotating machine 21 is started. In this view, erroneous detection of a rush current for an overcurrent is suppressed, and the erroneous determination of the abnormal short circuit (that is the abnormal overcurrent) can also be decreased.

Second Embodiment

Next in a second embodiment, a difference therebetween the first embodiment will mainly be described. In the second embodiment, when it is determined that the overcurrent has occurred as the result of the first determination based on the first threshold TH1, and the second determination based on the second threshold TH2, the switches 31 and 32 are opened after a predetermined time period has passed. The predetermined time is a time until the inverter current flow has decreased to the second threshold.

Figure 10:
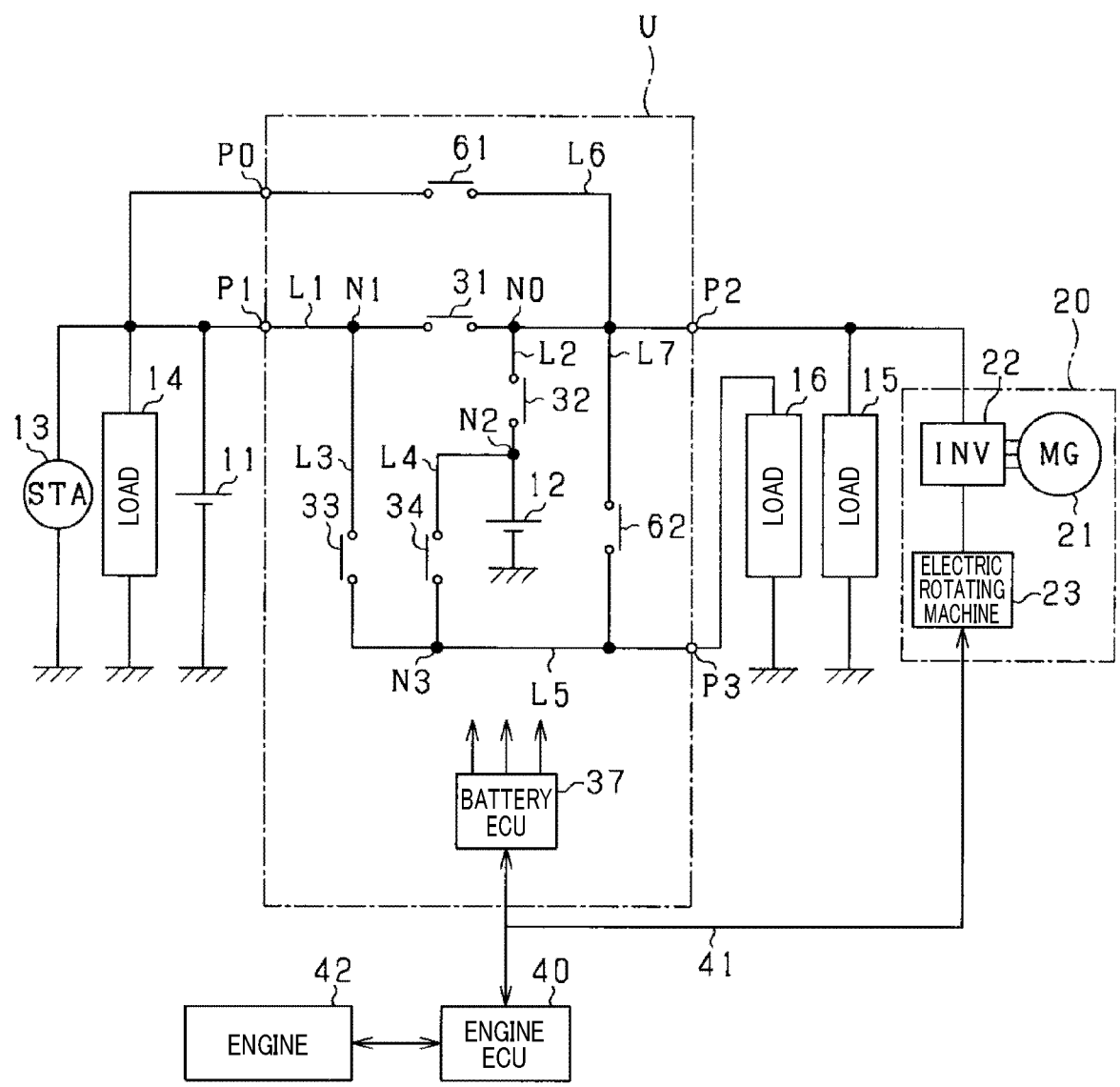
FIG. 10 is an electrical circuit showing the power system of a second embodiment.

A configuration of the power system of the second embodiment is show in FIG. 10. For convenience, the symbols which are used in FIG. 1 are also used for the same configuring elements shown in FIG. 10, and the description thereof is also omitted.

The battery unit U shown in FIG. 10 has the lead battery 11, the starter 13 and the electrical load 14 electrically connected to the output terminals P1 and P0, the electrical load 15 and the electric rotating machine unit 20 electrically connected to the output terminal P2, and the electrical load 16 electrically connected to the output terminal P3. In the second embodiment, among the electrical loads 14 to 16, an electrical load 16 contains a stable voltage requirement load.

The switch 31 is provided on the electrical pathway L1 and the switch 32 is provided on the electrical pathway L2, of the battery unit U. On the pathway L1, between the output terminal P1 and the switch 31, a connection point N1 is connected to an end of a branch pathway L3. On the pathway L2, between the lithium-ion battery 12 and the switch 32, a connection point N2 is connected to a branching pathway L4. Another end of each branching pathway L3 and L4 is connected to the neutral connection point N3. The neutral connection point N3 and the output terminal P3 are connected to each other via an electric supply pathway L5. The branching pathways L3 and L4 are provided with a switch 33 and 34, respectively. The switches 33 and 34 are both configured of semiconductor switching elements, for example, MOSFET. The electrical supply from each of the batteries 11 and 12 to the electrical load 16 is conducted via the pathways L3 to L5.

On the battery unit U, bypass pathways L6 and L7 allow connection of the lead battery 11 to the electrical loads 15 and 16 without passing through the switches 31 to 33. That is, the battery unit U is configured with the bypass pathway L6 that connects the output terminal P0 and connection point N0 to each other, and the bypass pathway L7 that connects the N0 connection point and P3 output terminal. The bypass pathway L6 is provided with a first bypass switch 61 and the bypass pathway L7 is provided with a second bypass switch 62. The bypass switches 61 and 61 are constitutively closed-type relay switches.

By closing the bypass switch 61, the lead battery 11 and the electrical load 15 are electrically connected, even when the switch 31 is OFF (opened). Also, by closing both the bypass switches 61 and 62, the lead battery 11 and the electrical load 16 are electrically connected, even when the switches 31 to 34 are completely switched OFF (opened).

An ON/OFF control (open/closing control) of the switches 31 to 34 and bypass switches 61 and 62 is controlled by the battery ECU 37. In this case, the ON/OFF control of the switches 31 to 34 is based on the charged state of the batteries 11 and 12, for example. Therefore charging and discharging can be executed by selectively using the lead battery 11 and the lithium-ion battery 12. It is noted that the bypass switches 61 and 62 are basically maintained in an open state when the power system is in operation, and when the operation is terminated these switches are switched to a closed state.

Among the calculation processes that are performed by the ECU 23, 37 and 40 (refer to FIG. 4 to FIG. 6), in the second embodiment, the calculation process that is performed by the engine ECU 40 (FIG. 5) and the calculation process that is performed by the battery ECU 37 (FIG. 6) are changed in the second embodiment. Therefore each of the calculation processes will be described herein after.

Figure 11:
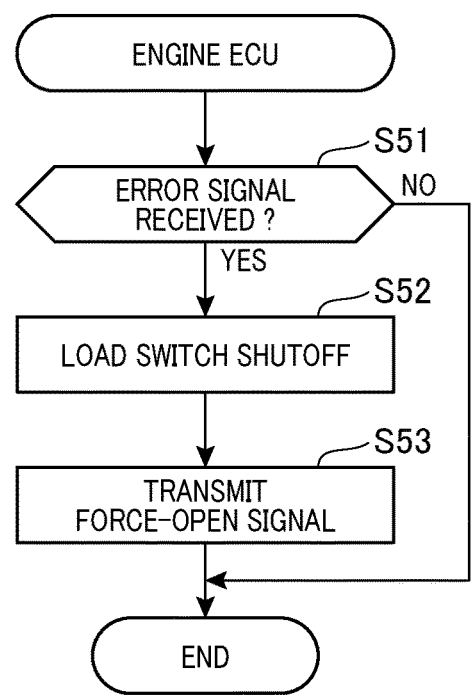
FIG. 11 is a flowchart showing a process of the abnormal monitoring executed by the engine ECU of the second embodiment.

FIG. 11 is a flowchart showing the abnormal monitoring process, which is repeatedly executed at predetermined cycles by the engine ECU 40.

As shown in FIG. 11, at step S51, it is determined whether the engine ECU 40 has received the abnormal overcurrent signal from the ECU 23 for the electric rotating machine. When the abnormal overcurrent signal is received, the process moves to step S52 and a pre-process (shutoff process section) to shutoff power is performed relative to the electrical load 15. That is the power to the electrical load is shutoff (shutoff process section). At this point, if the electrical load 15 is in an operating state, unfavorable occurrences, such as disorders caused by the sudden power shut off is suppressed, the working state of the electrical load 15 is recorded, and processes to decrease the output and terminate the driving, for example, are performed.

Thereafter, at step S53, the force-open signal to forcibly open the switches 31 to 34 is transmitted to the battery ECU 37.

Figure 12:
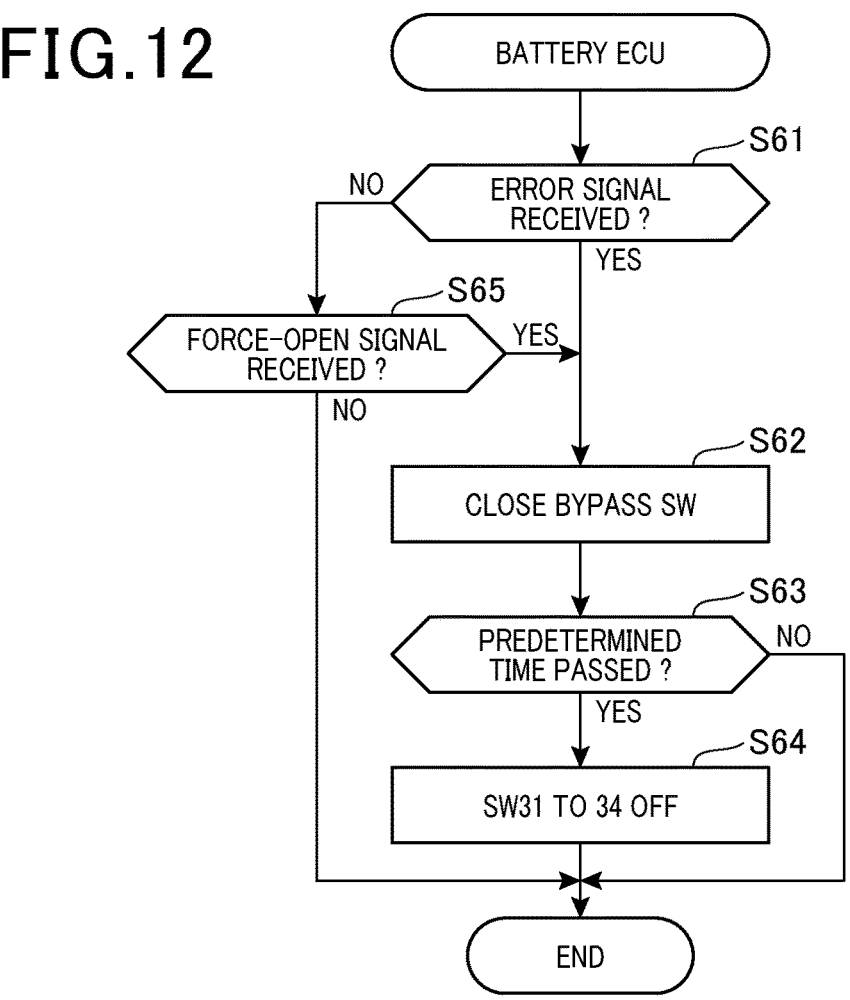
FIG. 12 is a flowchart showing a process of the failsafe control of the second embodiment.

FIG. 12 is a flowchart showing the failsafe process of the battery unit U, which is repeatedly executed at predetermined cycles by the battery ECU 37.

In FIG. 12, at step S61, it is determined whether the battery EUC 37 has received the abnormal overcurrent signal from the ECU 23 for the electric rotating machine. If the abnormal overcurrent signal is received, the process moves to step S62, and a command to close the bypass switches 61 and 61 is executed (bypass processing section). In this case, once the command to close the bypass switches 61 and 62 is executed, a current in a coil that configures the bypass switches 61 and 62 is stopped. The relay connection point is closed by an added force of a spring, for example, and thus switched OFF.

Thereafter, at step S63, it is determined whether a predetermined time TA has passed from a time point of receiving the abnormal overcurrent signal. The predetermined time TA is 0.3 to 1 second, for example. It is noted that since the time from when the abnormal overcurrent signal is transmitted until the same signal is received is substantially fixed time, at step S62, a process is performed to determine whether the predetermined time period has passed from the time point in which the inverter current flow (detected current Ia) has decreased to the second threshold TH2. At step S63, in a case of YES, the process moves to step S64, and a command to switch OFF the switches 31 to 34 (open) is executed. However, in a case of NO at step S63, the process is ended.

If the abnormal overcurrent signal is not received, the process moves to step S65 and it is determined whether the force-open signal is received from the engine ECU 40. If the force-open signal is received, the procedure moves to step S62, and the steps S62 to S64 described above are performed. In this case, the failsafe process is executed on the bases of the first received signal, among the abnormal overcurrent signal from the ECU 23 for the electric rotating machine and the force-open signal from the engine ECU 40.

Next, a detailed process that is performed when the abnormal overcurrent occurs at the inverter 22 will be described using a time chart shown in FIG. 13.

Figure 13:
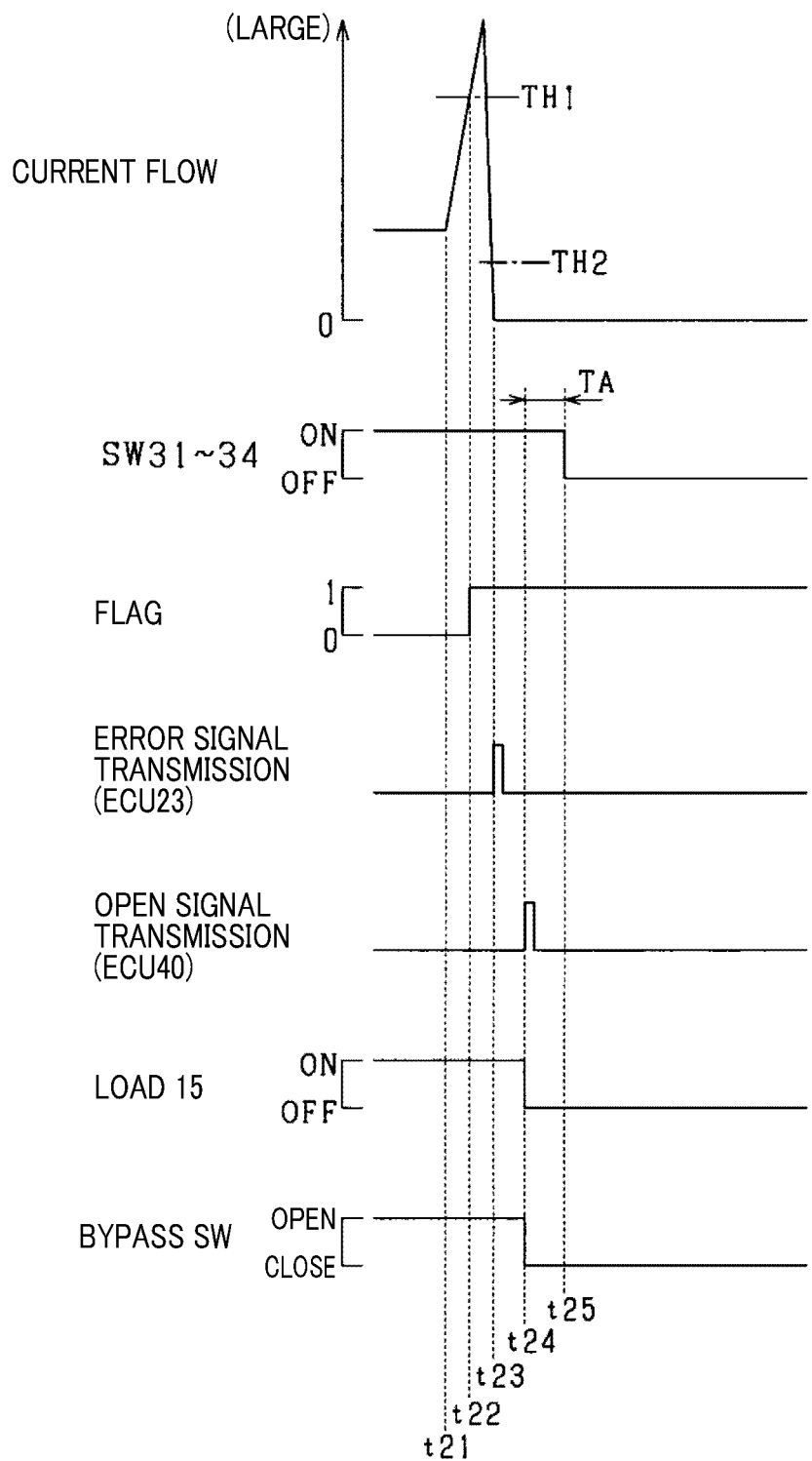
FIG. 13 is a time chart describing a process when the overcurrent occurs at the inverter.

As was described earlier in FIG. 7, in FIG. 13 also, the current flow in the inverter 22 is sharply increased (timing t21) by the short circuit occurrence in the inverter 22, for example, and the current flow exceeds the first threshold TH1 (at timing t22). On the switch module 50, the narrow section 52a of the lead portion 52 is fused and the current flow sharply decreases as a consequence.

Thereafter, at the timing t23, since the current flow drops to be less than the second threshold TH2, the abnormal overcurrent signal is output from the ECU 23 for the electric rotating machine. At timing t24, a pre-process for the power shutoff is performed relative to the electrical load 15. At this point, electricity to the electrical load 15 is terminated. At the timing t24 (or in some case before or after the timing t24) the bypass switches 61 and 62 are closed by the battery ECU 37.

Thereafter, once the predetermined time TA has passed from the time point in which the abnormal overcurrent signal is received at the timing t25, the switches 31 to 34 are switched OFF (opened).

According to the second embodiment the following additional effects are obtained.

In the second embodiment, when the overcurrent determination is performed with change of the inverter current flow, that is, by a respective increase and decrease of the inverter current flow, a configuration in which the switches 31 to 34 are opened once the predetermined time TA has passed is provided. In other words, the opening of the switches is not performed immediately after the decrease in the current flow is determined, however, performed after the predetermined time has passed. In this case, the occurrence of the increase and decrease of current flow, indicates that the overcurrent has occurred, and the pathway is shutoff by the shutoff section (the narrow part 52a) immediately after the overcurrent has occurred. With respect to the above described, it is considered that at least a first response to the overcurrent can be performed.

By performing the opening of the switches with sufficient amount of time under these conditions, an appropriate power shutoff measure can be performed. For example, considering that the power shutoff effect other devices, a premeasure can be executed relative to the power shutoff.

In a case of the inverter current flow decreasing to the second threshold TH2 (when the overcurrent is determined), the configuration provides execution of the power shutoff as a pre-measure during the time period from when the current decreases until switches 31 to 34 are opened. According to the configuration, the pre-measure of recording the operation state of the electrical load, decreasing the output and terminating the drive, for example, can be executed.

If the inverter current flow decreases to the second threshold TH2 (that is, when the overcurrent is determined), the configuration is provided with the bypass switches 61 and 62 that are closed, during the time period from when the current is decreased until switches 31 to 34 are opened. In this case, conduction of the bypass pathways L6 and L7 can be reliably performed, while taking in consideration the operation time of the bypass switches 61 and 62. A continuous power supply form the lead battery 11 to the electrical load 15 can be therefore conducted using the bypass pathways L6 and L7.

Third Embodiment

Next, in a third embodiment, a difference therebetween the first embodiment will mainly be described. It is noted that the power system shown in FIG. 1 is the power system of the third embodiment.

In the third embodiment, the ECU 23 for the electric rotating machine determines the re-increase of the inverter current flow that is temporarily decreased, when it is determined that the overcurrent in the inverter has occurred, which is determined by the first determination based on the first threshold TH1, and the second determination based on the second threshold. Additionally, when the ECU 23 for the electric rotating machine determines the overcurrent and the re-increase of the current flow has occurred, the battery ECU 37 opens the switches 31 and 32.

Among the previously described calculation processes performed by the ECU 23, 37 and 40 (FIG. 4 to FIG. 6) the calculation process that is performed by the ECU 23 for the electric rotating machine, relative to the calculation process shown 4 is changed in the third embodiment. The calculation process of the third embodiment will be now be described.

Figure 14:
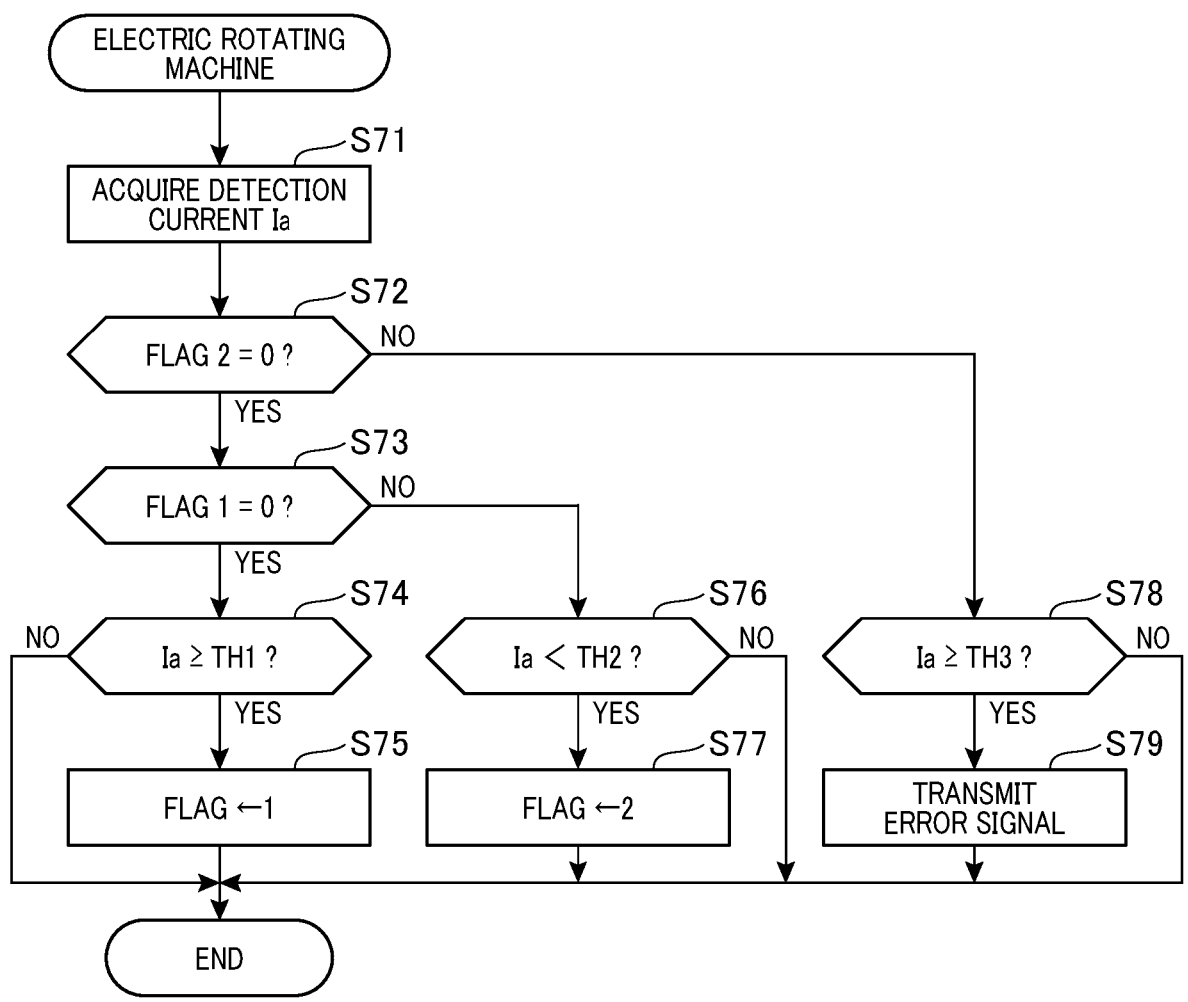
FIG. 14 is a flowchart showing a process of the abnormal overcurrent determination of a third embodiment.

FIG. 14 is flowchart showing the abnormal overcurrent determination process, which is repeatedly performed by the ECU 23 for the electric rotating machine at predetermined cycles. This process uses a first flag that indicates the inverter current flow is equal to or higher than the first threshold TH1, and a second flag that indicates thereafter the inverter current flow is less than the second threshold TH2.

In FIG. 14, at step S71 after the detection current Ia is acquired, if both the first and second flags are 0 (step S72, YES at step S73), the procedure moves to step S74, and it is determined whether the detected current Ia is equal to or higher than the first threshold TH1. If the detected current Ia is equal to or higher than the first threshold TH1, the process moves to step S75 and the first flag is set to 1.

Once the first flag is set to 1, the process moves to step S76, and it is determined whether the detected current Ia is less than the second threshold. If the detected current Ia is less than the second threshold TH2, the process moves to step S77 and the second flag is set to 1.

Once the second flag is set to 1, the process moves to step S78 and it is determined whether the detected current Ia is equal to or higher than a predetermined third threshold TH3. The predetermined third threshold TH3 may be a value that can determine the current flows after the lead portion 52 of the switching module 50 is fused, for example, the TH3 is 50 A. When the detected current Ia is equal to or higher than a predetermined third threshold TH3, the process moves to step S79, and the abnormal overcurrent signal is transmitted to the battery ECU 37 and the engine ECU 40 via the communication line 41.

Figure 15:
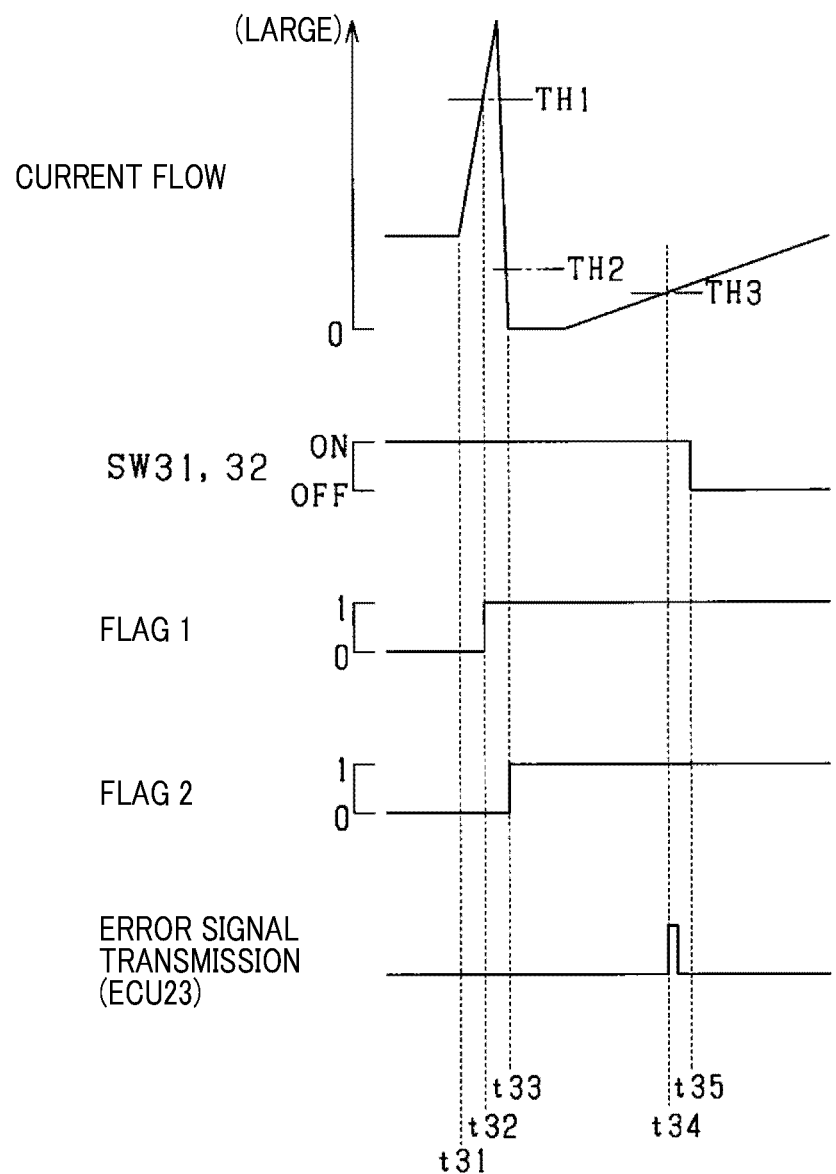
FIG. 15 is a time chart describing a process when the overcurrent occurs at the inverter.

Next, a process that is performed when the abnormal overcurrent occurs in the inverter 22 is described using a time chart shown in FIG. 15.

In FIG. 15, as described in FIG. 7, for example, the current flow of the inverter 22 sharply increases (timing t31) when a short circuit occurs in the inverter 22, and if the current flow exceeds the first threshold TH1, the first flag is set to 1 (timing t32). In switching module, the narrow part 52a of the lead portion 52 is fused that causes the current flow to sharply decrease. Thereafter, at timing t33, the current flow is less than the second threshold TH2 and the second flag is set to 1.

When the lead portion 52 is fused, the inverter current flow is re-increased by, for example, the fused section returning to the conduction state. That is, after the inverter current flow temporarily drops to 0, the current is then re-increased. In this case, at a timing 34, if the current flow exceeds the third threshold TH3, the abnormal overcurrent signal is output from the ECU 23 for the electric rotating machine. Then at a timing t35, the switches 31 and 32 are switched OFF (opened by the battery ECU 37).

According to the third embodiment, the additional following effects are obtained.

If a short circuit occurs in the electric motor 21 or the inverter 22, the measure of stopping the overcurrent is completed by shutting of the shutoff portion, (narrow part 52a). The shutoff section may return to a conduction state after the shutoff is performed. In this regard, the switches 31 and 32 are opened, when conduction returns to the shutoff section, as a condition. In other words, the power is shutoff by the opening of the switches under limited conditions after performing the abnormal overcurrent determination based on the first determination and the second determination. Therefore, effects to other devices that may occur may be minimized when the power is shutoff by the opening of the switches.

Other Embodiments

The embodiments described above may be modified as follows.

For example, in the embodiments described hereinabove, the first determination determines that the inverter current flow has increased to the first threshold TH1, and the second determination determines that the current thereafter is decreased. However, as a second determination, a current decrease may be determined after a predetermined time (for example, 0.5 to 1 second) has passed from the time period in which the inverter current flow has increased to the first threshold TH1.

The shutoff section that is configured to shutoff the electrical pathway with the overcurrent flowing in at least one of the electric rotating machine 21 and the inverter 22 may be a configuration other than the narrow part 52a of the lead portion in the switch module 50. For example, a fuse, for example, may be used as a fuse section that is provided on the electrical pathway of the inverter 22. A shutoff section (fuse section) may also be configured on the electric motor 21.

At the start of the power running drive of the electric rotating machine 21, a limit can be added to drive duty of the switches Sp and Sn of the inverter, and a rush current limit in accordance to limited drive duty, as alternative to the limit of the target value of the inverter current flow.

Figure 16:
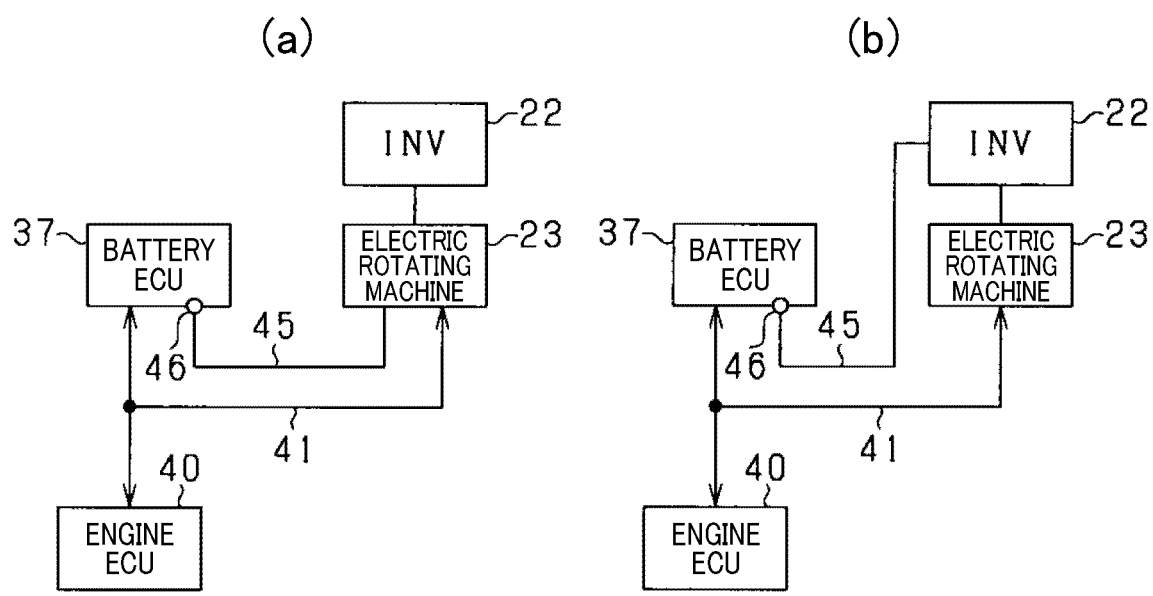
FIG. 16 is a circuit showing another configuration of the power control apparatus.

FIG. 16 shows a circuit as a different configuration of the power control apparatus. In FIG. 16 (a) the ECU 23, 37 and 40 are connected by the communication line 41, and the battery ECU 37 and the ECU 23 for the electric rotating machine are connected to a hard wire 45. In this case especially, the hardwire 45 is connected to an interruption port 46 of the battery ECU 37. The hardwire 45 is a signal line that transmits a voltage signal of an output port, provided on an output side of the ECU, to an input port on an input side of the ECU. It is noted that the communication line 41 is provided to allow signal transmission between at least the ECU 23, 37 and the ECU 40.

In this case, when the overcurrent occurs on a side of the electric rotating machine unit 20, an error signal is transmitted from the ECU 23 for the electric rotating machine to the interruption port 47 of the ECU 37. The failsafe process of the battery unit U is thus performed with the signal input to the interruption port 46.

In FIG. 16 (b) the ECU 23, 37 and 40, are electrically connected by the communication line 41, and the ECU 37 and inverter 22 are connected by the hardwire 45. In this case, the voltage signal on a side of the inverter 22 is directly transmitted to the interruption port 46 of the battery ECU 37, and the failsafe process of the battery unit U is performed by the this voltage signal.

As shown in FIG. 16, the battery ECU 37 and the electric rotating machine unit 20 (ECU 23 for the electric rotating machine or the inverter 22) are connected by the hardwire 45. In this configuration, signal transmission can be performed between the battery ECU 37 and the electric rotating machine unit 20 (ECU 23 for the electric rotating machine or the inverter 22), without waiting for communication cycle at each ECU. As a result, swift information transmission can be further enhanced.

The overcurrent determination section is actualized by the ECU 23 for the electric rotating machine, and the switch control section is actualized by the battery ECU 37, however the configuration is not limited to the above described. That is, the overcurrent determination section may be actualized by an ECU other than the ECU 23 for the electric rotating machine (such as the battery ECU 37 or the engine ECU 40). The power control system may also be actualized by a single ECU.

The configuration shown in FIG. 1, is provided the electrical load 14 that is the stable voltage requirement load, connected to a side of the output terminal P1 of the battery unit U, that is the side of the lead battery 11, and the electrical load 15 that is a general load connected to a side of the output terminal P2, that is the side of the electric rotating machine unit 20. However this configuration may be changed and, the electrical load 15 (general load) may be connected to the side of the output terminal P1 of the battery unit U, and the electrical load 14 (the stable voltage requirement load) may connected to the side of the output terminal P2.

In the embodiments described, a lead battery 11, as the first battery and a lithium-ion battery as the second battery are provided, however, this configuration may be changed. For example, a high density battery, other than the lithium-ion battery may be provided as the second battery, for example, a nickel hydrogen battery may also be used. A capacitor may also be used as at least one of the batteries.

A power system other than the power system that has two batteries may also be adopted. For example, a configuration which includes only a lead battery 11 or only a lithium-ion battery may also be used.

In addition, the power system of the present disclosure may also be adopted for purposes other than a vehicle.

It is to be understood that, the present disclosure is described in accordance with the embodiments, however, not limited to the above described. That is, the present disclosure includes various modified examples and modifications within the equivalent ranges. In addition, various combinations and modes which include a combination of one element, more than one element are included within category and the scope of the disclosure.

What is claimed is:

1. A power control apparatus comprising
an electric rotating machine that selectively performs an operation of power generation and an operation of power running;
a switching circuit that provides electricity for each phase of a plurality of phases of the electric rotating machine, by operably switching a plurality of switching elements between an ON state and an OFF state;
a battery section electrically connected to the switching circuit;
switches mounted on an electrical pathway between the switching circuit and the battery section;
a first electrical load that is connected to the electrical pathway between the battery section and the switching circuit; and
a control system including at least one processor programmed to execute instructions that cause the processor to:
shutoff the electrical pathway when an overcurrent occurs in at least one of the electric rotating machine and the switching circuit,
determine that the overcurrent has occurred, based on a result of a first determination which determines that, in the switching circuit, a current flow has increased to an overcurrent threshold, and a second determination determining that the current flow has decreased, after the increase to the overcurrent threshold, and
open the switches based on the result of the first determination and the second determination,
wherein the instructions further cause the at least one processor to:
determine that the current flow has decreased to a second threshold that is smaller than the overcurrent threshold, after determining that the current flow has increased to the overcurrent threshold,
open the switches after a predetermined time period has passed, the predetermined time period being from a time point at which the current flow has decreased to the second threshold until the predetermined time period has passed, when the at least one processor has determined that the overcurrent has occurred, and
perform a pre-process of a power shutoff, of the first electrical load, from the time point at which the current flow has decreased to the second threshold, until the predetermined time period has passed.

2. The power control apparatus according to claim 1, wherein
a first battery and a second battery form the battery section;
the power control apparatus further comprises:
a second electrical load that is connected to a second electrical pathway allowing a power supply from the battery section;
bypass pathways provided on the second electrical pathway, the bypass pathways electrically connected to the first battery and the second electrical load, providing a bypass over the switches, and having bypass switches; and
the instructions further cause the at least one processor to close the bypass from the time point at which the current flow has decreased to the second threshold until the predetermined time period has passed.

3. The power control apparatus according to claim 1, wherein the instructions further cause the at least one processor to:
determine that the current flow has re-increased after the decrease, when the occurrence of the overcurrent is determined and open the switches when the overcurrent has occurred and the re-increase of the current flow is determined.

4. The power control apparatus according to claim 1, wherein the at least one processor includes a first processor and a second processor, the power control apparatus further comprising
an inverter as a first control device including the first processor, the first control device controlling the operation of the power generation and the operation of the power running of the electric rotating machine; and
a second control device including the second processor, the second processor receiving signals from the first control device, and the second processor executing instructions to cause charging of the battery section by opening and closing the switches, wherein
the first control device is operable to transmit, to the second control device, a determination signal that indicates a determination result of the overcurrent, and
the second processor executes instructions to open the switches based on the determination signal that is transmitted from the first control device.

5. The power control apparatus according to claim 4, wherein the at least one processor further includes a third processor, the power control apparatus further comprising
   a third control device including the third processor, the third control device being connected to the first control device and the second control device, so that communication is operable between the first control device, the second control device and the third control device, and which is provided as a host device of the first control device and the second control device, wherein
   the first control device transmits the determination signal to the second control device and the third control device,
   the third control device transmits a signal, to the second control device, instructing forcible opening of the switches of the second control device, based on the determination signal that is received from the first control device, and
   the second processor executes instructions to cause forcible opening of the switches based on the determination signal received from the first control device and the signal instructing the forcible opening of the switches received from the third control device.

6. The power control apparatus according to claim 1, further comprising:
   a lead section having a narrow portion that is narrower than other portions of the lead section, the lead section connected with a mounting position of the switching elements.

7. The power control apparatus according to claim 3, wherein
   a first battery and a second battery form the battery section;
   the power control apparatus further comprises:
   a second electrical load that is connected to a second electrical pathway allowing a power supply from the battery section;
   bypass pathways provided on the second electrical pathway, the bypass pathways electrically connected to the first battery and the second electrical load, providing a bypass over the switches, and having bypass switches; and
   the instructions further cause the at least one processor to close the bypass from the time point at which the current flow has decreased to the second threshold until the predetermined time period has passed.

8. The power control apparatus according to claim 2, wherein the at least one processor includes a first processor and a second processor, the power control apparatus further comprising
   an inverter as a first control device including the first processor, the first control device controlling the operation of the power generation and the operation of the power running of the electric rotating machine; and
   a second control device including the second processor, the second processor receiving signals from the first control device, and the second processor executing instructions to cause charging of the battery section by opening and closing the switches, wherein
   the first control device is operable to transmit, to the second control device, a determination signal that indicates a determination result of the overcurrent, and
   the second processor executes instructions to open the switches based on the determination signal that is transmitted from the first control device.

9. The power control apparatus according to claim 3, further comprising
   an inverter as a first control device including a first processor, the first control device controlling the operation of the power generation and the operation of the power running of the electric rotating machine; and
   a second control device including a second processor, the second processor receiving signals from the first control device, and the second processor executing instructions to cause charging of the battery section by opening and closing the switches, wherein
   the first control device is operable to transmit, to the second control device, a determination signal that indicates a determination result of the overcurrent, and
   the second processor executes instructions to open the switches based on the determination signal that is transmitted from the first control device.

10. The power control apparatus according to claim 6, wherein the at least one processor includes a first processor and a second processor, the power control apparatus further comprising
    an inverter as a first control device including the first processor, the first control device controlling the operation of the power generation and the operation of the power running of the electric rotating machine; and
    a second control device including the second processor, the second processor receiving signals from the first control device, and the second processor executing instructions to cause charging of the battery section by opening and closing the switches, wherein
    the first control device is operable to transmit, to the second control device, a determination signal that indicates a determination result of the overcurrent, and
    the second processor executes instructions to open the switches based on the determination signal that is transmitted from the first control device.

11. The power control apparatus according to claim 7, wherein the at least one processor includes a first processor and a second processor, the power control apparatus further comprising
    an inverter as a first control device including the first processor, the first control device controlling the operation of the power generation and the operation of the power running of the electric rotating machine; and
    a second control device including the second processor, the second processor receiving signals from the first control device, and the second processor executing instructions to cause charging of the battery section by opening and closing the switches, wherein
    the first control device is operable to transmit, to the second control device, a determination signal that indicates a determination result of the overcurrent, and
    the second processor executes instructions to open the switches based on the determination signal that is transmitted from the first control device.

12. The power control apparatus according to claim 2, further comprising:
    a lead section having a narrow portion that is narrower than other portions of the lead section, the lead section connected with a mounting position of the switching elements.

13. The power control apparatus according to claim 4, further comprising:
    a lead section having a narrow portion that is narrower than other portions of the lead section, the lead section connected with a mounting position of the switching elements.

14. The power control apparatus according to claim 5, further comprising:

a lead section having a narrow portion that is narrower than other portions of the lead section, the lead section connected with a mounting position of the switching elements.

15. A power control apparatus comprising:

a control system including at least one processor programmed to execute instructions that cause the processor to:
  shutoff an electrical pathway when an overcurrent occurs in at least one of an electric rotating machine and a switching circuit,
  determine that the overcurrent has occurred, based on a first determination that, in the switching circuit, a current flow has increased to an overcurrent threshold, and a second determination determining that the current flow has decreased after the increase to the overcurrent threshold; and
  open switches provided on the electrical pathway based on results of the first determination and the second determination,
wherein the instructions further cause the at least one processor to:
  determine that the current flow has decreased to a second threshold that is smaller than the overcurrent threshold, after determining that the current flow has increased to the overcurrent threshold,
  open the switches after a predetermined time period has passed from a time point at which the current flow has decreased to the second threshold after determining that the overcurrent has occurred, and
  perform a pre-process of a power shutoff, of a first electrical load connected to the electrical pathway, from the time point at which the current flow has decreased to the second threshold, until the predetermined time period has passed.

* * * * *